United States Patent [19]
Levy et al.

[11] Patent Number: 6,134,662
[45] Date of Patent: Oct. 17, 2000

[54] PHYSICAL LAYER SECURITY MANAGER FOR MEMORY-MAPPED SERIAL COMMUNICATIONS INTERFACE

[75] Inventors: Paul S. Levy, Chandler; Steve Cornelius, Gilbert, both of Ariz.

[73] Assignee: VLSI Technology, Inc., San Jose, Calif.

[21] Appl. No.: 09/105,553

[22] Filed: Jun. 26, 1998

[51] Int. Cl.[7] ................................................. G06F 12/14
[52] U.S. Cl. ..................... 713/200; 713/201; 713/160; 713/161
[58] Field of Search ..................... 713/200, 201, 713/160, 161; 380/23, 25, 4

[56] References Cited

U.S. PATENT DOCUMENTS

| | | | |
|---|---|---|---|
| 6,009,527 | 12/1999 | Traw et al. | 713/200 |
| 6,061,746 | 5/2000 | Stanley et al. | 710/10 |
| 6,061,794 | 5/2000 | Angelo et al. | 713/200 |

OTHER PUBLICATIONS

Anderson, Don *FireWire System Architecture: IEEE 1394*, First Edition, Addison Wesley, MindShare, Inc., 1998.

*Primary Examiner*—Robert W. Beausoliel, Jr.
*Assistant Examiner*—James G. Weir
*Attorney, Agent, or Firm*—Wood, Herron & Evans, L.L.P.

[57] ABSTRACT

A distributed firewall is utilized in conjunction with a memory-mapped serial communications interface such as that defined by the IEEE 1394 specification to permit secure data transmission between selected nodes over the interface. The distributed firewall incorporates security managers in the selected nodes that are respectively configured to control access to their associated nodes, thereby restricting access to such nodes to only authorized entities. The security manager in at least one of the nodes is implemented in the physical (PHY) layer for the communications interface. The security manager controls access to its associated node by selectively modifying data packets received from unauthorized entities in such a manner that acceptance of the modified data packets by the link layer is inhibited, e.g., by modifying the checksum in a data packet so that, upon receipt by the link layer of the associated node, the data packet is determined to be invalid by the link layer. As a result, the link layer may disregard the data packet so that effectively the unauthorized attempt to access the node is ignored.

25 Claims, 9 Drawing Sheets

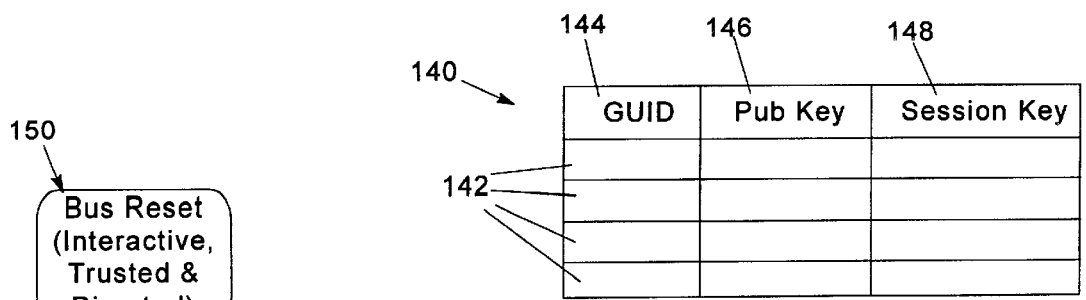
Fig. 5
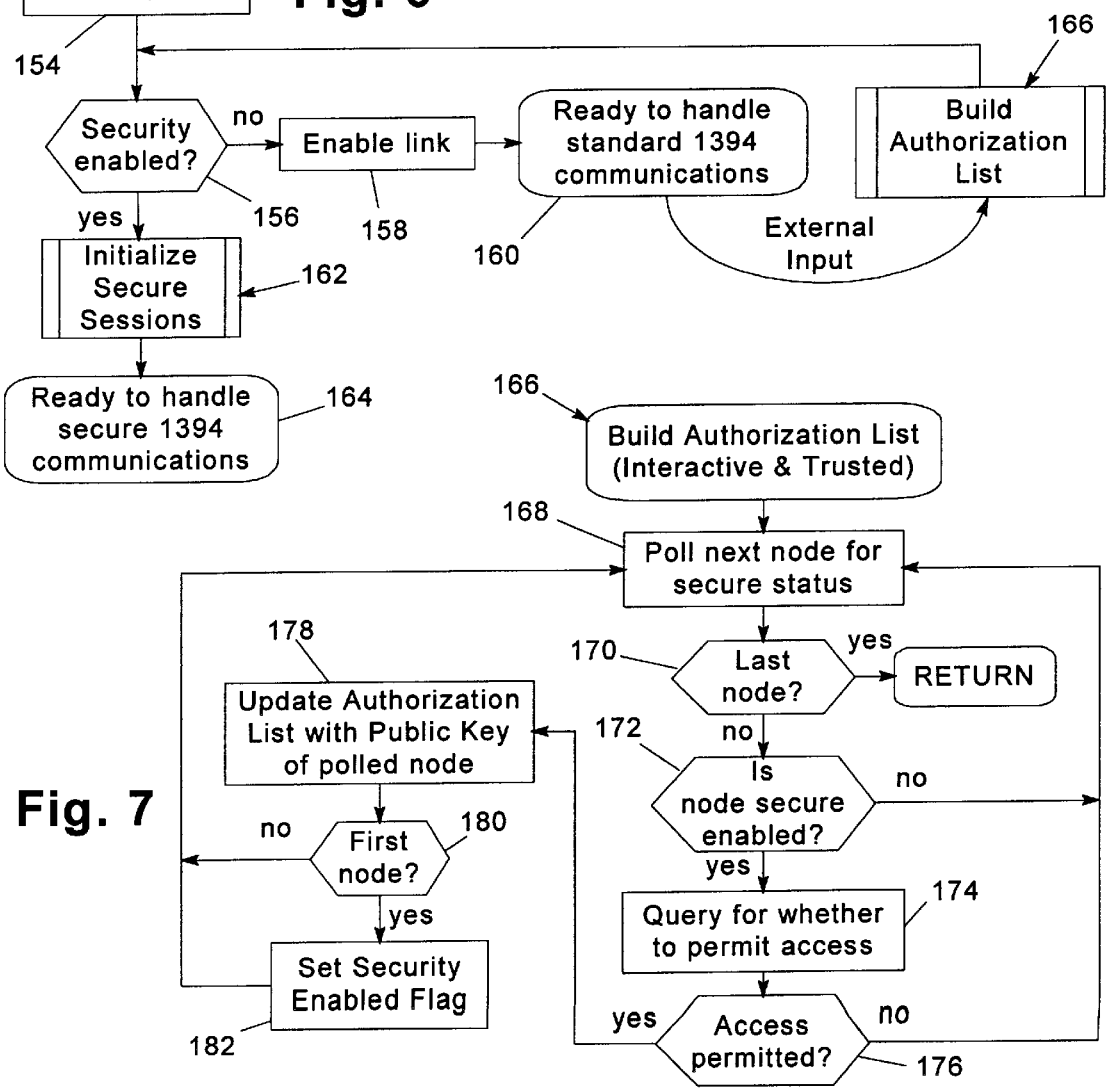
Fig. 6
Fig. 7

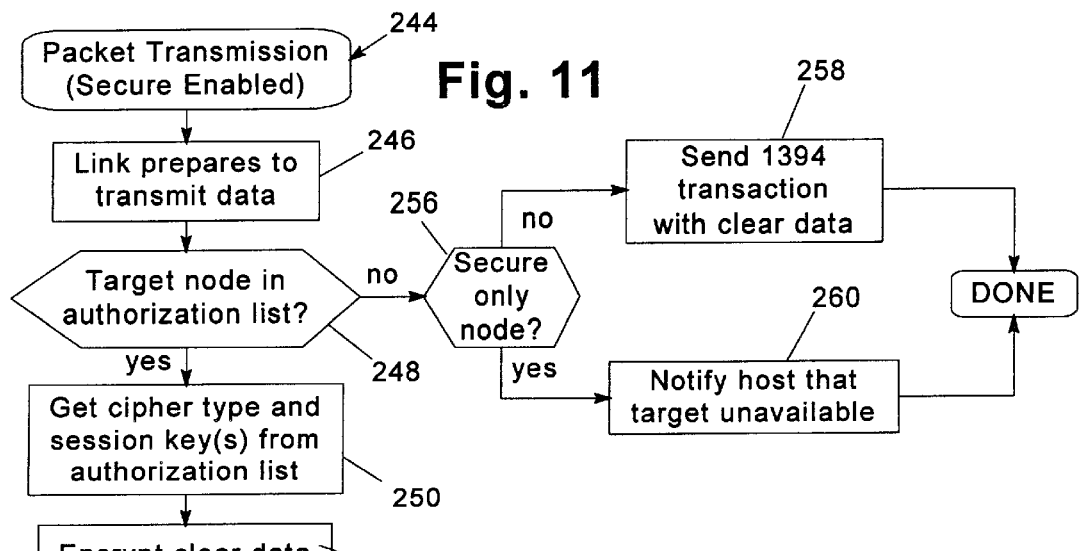
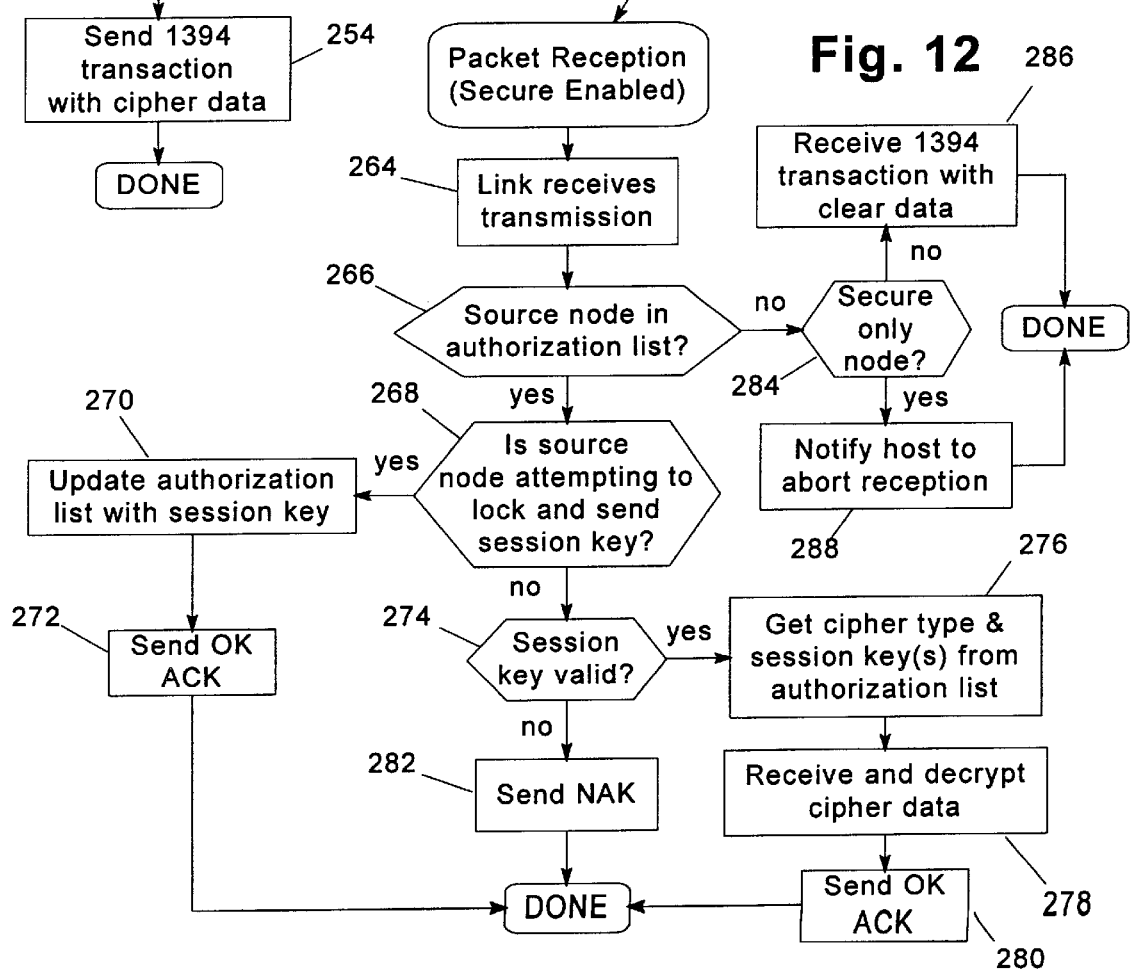

PHYSICAL LAYER SECURITY MANAGER FOR MEMORY-MAPPED SERIAL COMMUNICATIONS INTERFACE

CROSS-REFERENCE TO RELATED APPLICATIONS

This application is related to U.S. patent application Ser. No. 09/105,285, filed on even date herewith by Paul S. Levy et al. and entitled "SECURE DATA COMMUNICATION OVER A MEMORY-MAPPED SERIAL COMMUNICATIONS INTERFACE UTILIZING A DISTRIBUTED FIREWALL," which application is incorporated by reference herein.

FIELD OF THE INVENTION

The invention is generally related to data communication over a serial communications interface, as well as to secure data communication incorporating data encryption and/or access control.

BACKGROUND OF THE INVENTION

An important aspect of many electronic devices is the ability to communicate with other electronic devices for the purpose of constructing systems that perform useful tasks for users. For example, in many computer applications, the central processing unit (CPU) of a computer may need to communicate with a user input device such as a keyboard and/or a mouse; a display device such as a video display or computer monitor, an external storage device such as a floppy disk drive, a hard disk drive, a tape drive and/or an optical disk drive (e.g., a compact disk (CD) drive or a digital versatile disk (DVD) drive); or other peripheral devices such as a printer, a scanner, a camera, a modem, and/or an external network connection, among others.

In addition, other types of electronic devices typically need to communicate with one another. For example, in many multimedia applications such as home entertainment systems, various electronic devices such as audio receivers, audio amplifiers, televisions, video cassette recorders, CD players, DVD players, and set top boxes, among others, may communicate with one another to display audio and/or video information to a user.

Traditionally, most electronic devices in the aforementioned applications have been coupled together using dedicated point-to-point digital or analog interfaces that form individual input/output (I/O) channels between pairs of devices. However, each point-to-point interface typically requires a dedicated connection, and as a result, a great deal of circuitry and cabling may be required to interface a number of devices together. For example, a typical personal computer (PC) may include separate connectors and cables for interfacing with a keyboard, a mouse, a computer monitor, audio speakers, a disk drive, a CD drive, a printer, and a modem, among others. The connectors and cables often differ from one another and are not interchangeable. Morever, each interface also typically communicates via a unique language, known as a "protocol", that is not compatible with the protocols of other interfaces.

Even beyond the drawback of producing a tangled mess of cables in the rear of a computer, the use of multiple widely disparate interfaces also induces performance and compatibility problems, e.g., due to the lack of scalability, upgradability and/or commonality of many such interfaces. In particular, a significant number of interfaces are limited in performance by the necessity to support legacy components. Therefore, even though a computer may include faster and more powerful internal components, the computer's ability to perform with peak efficiency may be limited by older and slower interfaces through which it must communicate to perform its tasks. This problem has recently grown in significance as video applications have become more popular due to the huge bandwidth requirements of video information.

To address these concerns, significant efforts have been expended in developing high performance standardized interfaces that permit multiple electronic devices to share the same interface. One such interface is based on the Institute of Electrical and Electronics Engineers (IEEE) specification IEEE 1394 (also referred to as FireWire®). The IEEE 1394 specification defines a standard serial bus interface that, among other advantages, provides scalable, fast and reliable communication between pairs of devices coupled over such an interface. An IEEE 1394 interface permits electronic devices to be daisy chained together using common connectors, and also supports "hot pluggability", where devices may be attached or removed from the interface dynamically while other devices coupled to the interface continue to operate. One such use of hot pluggability, for example, is in a hot swappable device bay defined by the Device Bay specification, which permits different computer components, such as hard disk drives, floppy disk drives, CD drives, DVD drives, etc., to be installed into and/or removed from a common bay on a desktop computer without requiring that the computer be powered down.

An IEEE 1394 interface is defined by multiple overlapping protocol layers that define the communication protocols used by the interface. At the base layer, known as the physical (PHY) layer, electrical signals transferred across the physical wires in the interface are converted to logical "1" and "0" values. These logical values are converted into strings of logical values known as packets in a "link" layer that interfaces with the PHY layer. The packets are then passed either to a "transaction" layer that assembles the packets into transactions, or to a software driver that directly operates on the packets. Information to be transmitted is passed in a reverse manner, from the software driver, optionally to the transaction layer, to the link layer, to the PHY layer, and then out across the physical wires forming the interface.

An IEEE 1394 interface is one example of a "memory-mapped" serial communications interface, where the interface defines a unified memory space that is distributed between the various devices coupled to the interface (with each device including one or more "nodes" on the interface). Thus, a node can typically initiate a communication with another node by specifying a memory address allocated to that other node in the unified memory space. Another important aspect of an IEEE 1394 interface is that "peer-to-peer" communications are supported, meaning that any two nodes can communicate directly with one another, without having to pass communications through a single master device.

Peer-to-peer communications are particularly useful in bandwidth-intensive operations such as video communications. Thus, for example, if a computer CPU is coupled to a video display and a DVD drive through an IEEE 1394 interface, the DVD drive could transmit video information directly to the video display over the interface, thereby eliminating the need for the CPU to process and oversee the transmission.

While the IEEE 1394 specification defines an extremely efficient, scalable, flexible, reliable and fast interface, one problem associated with the specification, as well as with other such memory-mapped communications interfaces, is that there is no provision for secured communications between devices coupled to such interfaces. Each data transmission is broadcast to every node on the interface. Only a node that is indicated as the destination for a data transmission handles the transmission—all other nodes ignore the data transmission. Moreover, data is transmitted without any encryption—a process often used in other environments to scramble transmitted information and thereby prevent unauthorized entities from comprehending any intercepted information. Consequently, it is feasible in theory for an unauthorized device to be coupled to an IEEE 1394 interface and intercept practically any information transmitted to other nodes on the interface.

Another risk inherent with many memory-mapped communications interfaces is that there is no reliable manner of ensuring the identity of any particular node. Thus, it would also be feasible in theory for an unauthorized device to mimic another device to obtain private, and possibly sensitive, information internal to other devices coupled to the interface.

It is anticipated that IEEE 1394-based interfaces will eventually be used in a wide variety of applications. However, the utility of such interfaces is significantly limited by virtue of the lack of security support. One limitation is the inability to support copy protection, as it would be possible, for example, for an unauthorized device to intercept and record the transmission of a copyrighted movie from a DVD drive to a video display over such an interface. Another limitation is the inability to protect the confidentiality of sensitive information, since such information would not be protected from unauthorized viewing. A conventional IEEE 1394 interface is also susceptible to "hacking", since any node may be capable of controlling other nodes through appropriate commands. Thus, for example, it would be extremely risky to couple a modem, a disk drive and a computer CPU together on a conventional IEEE 1394-based interface, since a possibility would exist that an unauthorized entity gaining access to the interface through the modem would have full access to the computer as well as to all of the data on the disk drive.

It is believed that the ability to secure transmissions over a memory-mapped communications interface such as defined by the IEEE 1394 specification would lead to greater acceptance of the specification in many new and important applications. Equally important to widespread acceptance of such interfaces, however, is adherence to a well-defined and accepted standard, and any attempt to deviate from such a standard would likely lead to incompatibility with other devices compatible with the standard.

Moreover, another concern that may need to be addressed in some applications is that of implementing support for secure transmissions with minimum additional cost and effort over conventional designs. Specifically, a great deal of development effort has and continues to be expended in developing hardware components for use in supporting conventional IEEE 1394 interfaces. To the extent that such components could be used in a secure environment would decrease the additional effort associated with implementing secure transmissions over such an interface.

Therefore, a significant need has arisen for a manner of securing data communication over a memory-mapped communications interface in a manner that retains compatibility with an existing standard, and that does not require significant additional expenditure and effort. Among other interfaces, a specific need exists for a manner of supporting secure data transmission between devices over an IEEE 1394-based interface while retaining compatibility with legacy IEEE 1394-compatible devices coupled to such an interface.

SUMMARY OF THE INVENTION

The invention addresses these and other problems associated with the prior art by utilizing in conjunction with a memory-mapped serial communications interface a distributed firewall to permit secure data transmission between selected nodes over the interface. The distributed firewall incorporates security managers in the selected nodes, with the security manager in at least one of the nodes implemented in the physical (PHY) layer for the communications interface. The security managers are respectively configured to control access to their associated nodes, thereby restricting access to such nodes to only authorized entities.

When a security manager is implemented in the PHY layer for the communications interface, the security manager controls access to its associated node by selectively modifying data packets received from unauthorized entities in such a manner that acceptance of the modified data packets by the link layer is inhibited. For example, although other manners of modifying data packets may be used, a security manager consistent with the invention may modify a checksum in a data packet so that, upon receipt by the link layer of the associated node, the data packet is determined to be invalid by the link layer. As a result, the link layer may disregard the data packet so that effectively the unauthorized attempt to access the node is ignored.

One significant advantage of the use of a secure PHY layer is that other protocol layers implemented in the associated node may not be required to incorporate any particular security-related functionality. Instead, the implementation of a distributed firewall is transparent to the other layers. Thus, the other layers may implement a conventional specification for an unsecured memory-mapped communications interface, yet may operate without modification in a secured environment. Therefore, for an interface such as that defined by the IEEE 1394 specification, the other layers may be implemented to support only conventional unsecured IEEE 1394 communications. Among other advantages, this may permit a dedicated integrated circuit device or other circuit arrangement implementing a secure PHY layer to be interfaced with conventional IEEE 1394-compatible circuitry, either to retrofit an existing electronic device or design or to facilitate the creation of new electronic devices and designs that require minimal customized circuitry.

Therefore, consistent with one aspect of the invention, a physical layer circuit arrangement is provided for interfacing a local node in an electronic device to a memory-mapped serial communications interface of the type that supports peer-to-peer communications between a plurality of nodes. The circuit arrangement includes a link layer interface coupled to a link layer defined in the electronic device, the link layer interface configured to transmit data to and receive data from the link layer; and a security manager coupled to the link layer interface and configured to modify a data packet received over the communications interface from an unauthorized node prior to transmission of the data packet over the link layer interface to inhibit acceptance of the modified data packet by the link layer.

Consistent with another aspect of the invention, a method is provided for controlling access to a local node in an electronic device from a memory-mapped serial communications interface of the type that supports peer-to-peer communications between a plurality of nodes. The method includes receiving a data packet over the communications interface from an unauthorized node; and modifying the data packet prior to transmitting the data packet over a link layer interface to a link layer in the electronic device to inhibit acceptance of the modified data packet by the link layer.

Consistent with an additional aspect of the invention, a method is provided for implementing secure communications over a memory-mapped serial communications interface of the type that supports unsecured peer-to-peer communications between a plurality of nodes, with each node including a link layer implemented in a first integrated circuit device, and the link layer configured to communicate over the communications interface solely through an unsecured protocol. The method includes installing, in at least first and second nodes from the plurality of nodes, a second integrated circuit device, the second integrated circuit device implementing a physical layer circuit arrangement that interfaces the link layer in the first integrated circuit device with the communications interface. The physical layer circuit arrangement includes a security manager coupled between the link layer and the communications interface and configured to modify a data packet received over the communications interface from an unauthorized node prior to transmission of the data packet to the link layer to inhibit acceptance of the modified data packet by the link layer.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 5 is a block diagram of an authorization list for use in the security manager of FIG. 4.

FIG. 6 is a flowchart illustrating the program flow during a bus reset operation for an interactive, trusted or directed secured node consistent with the invention.

FIG. 7 is a flowchart illustrating the program flow of the build authorization list routine of FIG. 6, for use in an interactive or trusted secured node.

FIG. 11 is a flowchart illustrating the program flow of a packet transmission routine for use in a secured node consistent with the invention.

FIG. 12 is a flowchart illustrating the program flow of a packet reception routine for use in a secured node consistent with the invention.

DETAILED DESCRIPTION

Figure 1:
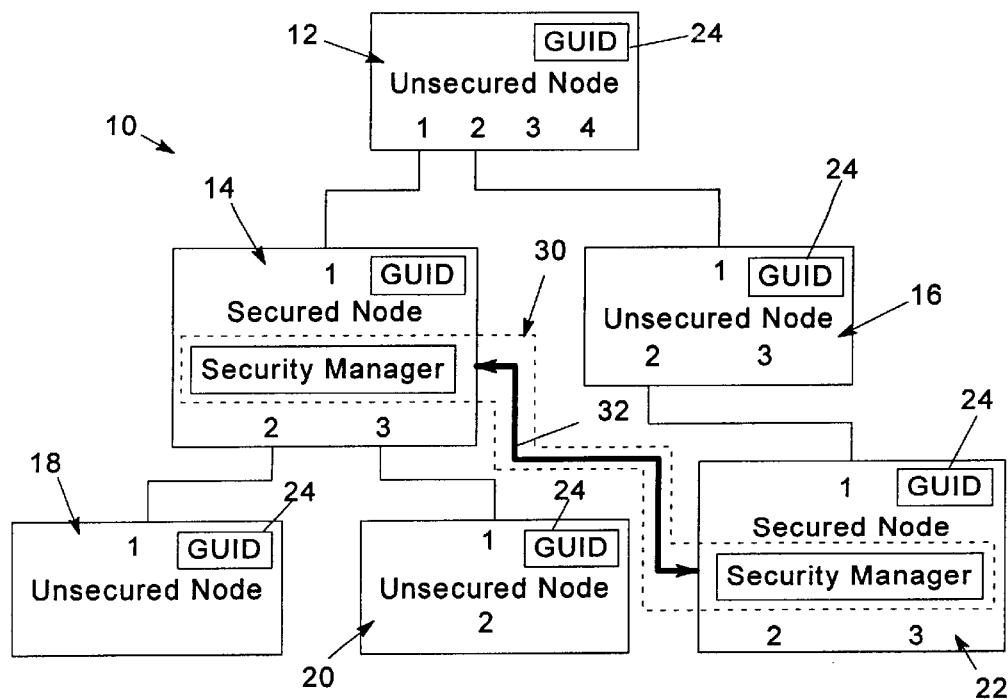
FIG. 1 is a block diagram of a data processing system implementing a distributed firewall consistent with the invention.

Turning to the Drawings, wherein like numbers denote like parts throughout the several views, FIG. 1 illustrates a memory-mapped serial communications interface 10 consistent with the principles of the invention. A memory-mapped serial communications interface consistent with the invention typically allocates a unified memory space to one or more nodes coupled to the interface, with each node having a portion of the memory space that is accessible by other nodes by referring to specific memory addresses within that allocated portion. Such an interface also supports peer-to-peer networking, whereby any node is typically able to directly communicate with any other node by accessing memory addresses in the allocated portion of the memory space for that other node—and without requiring communications to be routed through a single master node. Furthermore, such an interface is also serial in nature, thereby minimizing the number of physical wires defining the links between nodes.

Interface 10 in the illustrated embodiment is implemented as an Institute of Electrical and Electronics Engineers (IEEE) specification IEEE 1394 (FireWire®) interface, e.g., as defined in any or all of the published specifications and/or working drafts thereof including but not limited to IEEE 1394-1995, IEEE 1394a, and IEEE 139-B, and any others that exist or may hereinafter be developed. Such specifications are well known in the art, and the reader is thus directed to these specifications for a better understanding of the general operation of a conventional IEEE 1394 interface. It should also be appreciated that the invention may be utilized in connection with other memory-mapped serial communications interfaces, and thus, the invention should not be limited solely to use with an IEEE 1394 interface.

Interface 10 includes the plurality of nodes (e.g., nodes 12, 14, 16, 18, 20 and 22) interconnected with one another in a daisy-chained fashion. Each node typically has one or more ports, each of which selectively couples to another port on another node in the interface. Nodes with multiple ports permit a daisy-chained topology even though the signaling environment is point-to-point. Whenever a multi-port node receives a packet, it is detected and retransmitted over each other port on the node.

Each node also includes a globally unique identifier (GUID) 24 that uniquely identifies each node attached to the interface. The GUID of each node is typically stored during production of the device within which the node is implemented, and thus, each individual node on interface 10 will always be assured of being uniquely identifiable regardless of which other nodes are coupled to the interface.

Consistent with the invention, nodes 14 and 22 are examples of secured nodes, each of which utilizes an associated security manager 26, 28. Security managers 26, 28 cooperatively form a distributed firewall, represented at 30. A secured communications link between the secured nodes is represented at 32.

A distributed firewall is generally considered to be a collection of security managers that each control the access to their associated secured nodes from the interface. It should be appreciated that the distributed firewall 30 may include any number of secured nodes consistent with the invention, and may define any number of secured communications links between such nodes. Moreover, as will become more apparent below, the use of secured nodes implementing security managers that comprise the distributed firewall typically do not prohibit unsecured communications to be made according to conventional IEEE 1394 communications, e.g., as represented by unsecured nodes 12, 16, 18 and 20. It should be appreciated, therefore, that any combination of secured and unsecured nodes may be provided in a memory-mapped serial communications interface consistent with the invention.

With interface 10, each node 12–22 is allocated a portion of the memory address space for the interface. A security manager for a node may be used to restrict access to only some or all of the memory address space allocated to that node consistent with the invention. It should be appreciated, however, that while access to a node may be limited to only a subset of available nodes, each node coupled to the interface is still capable of recognizing other nodes regardless of whether or not it is authorized to communicate with such nodes.

Figure 2:
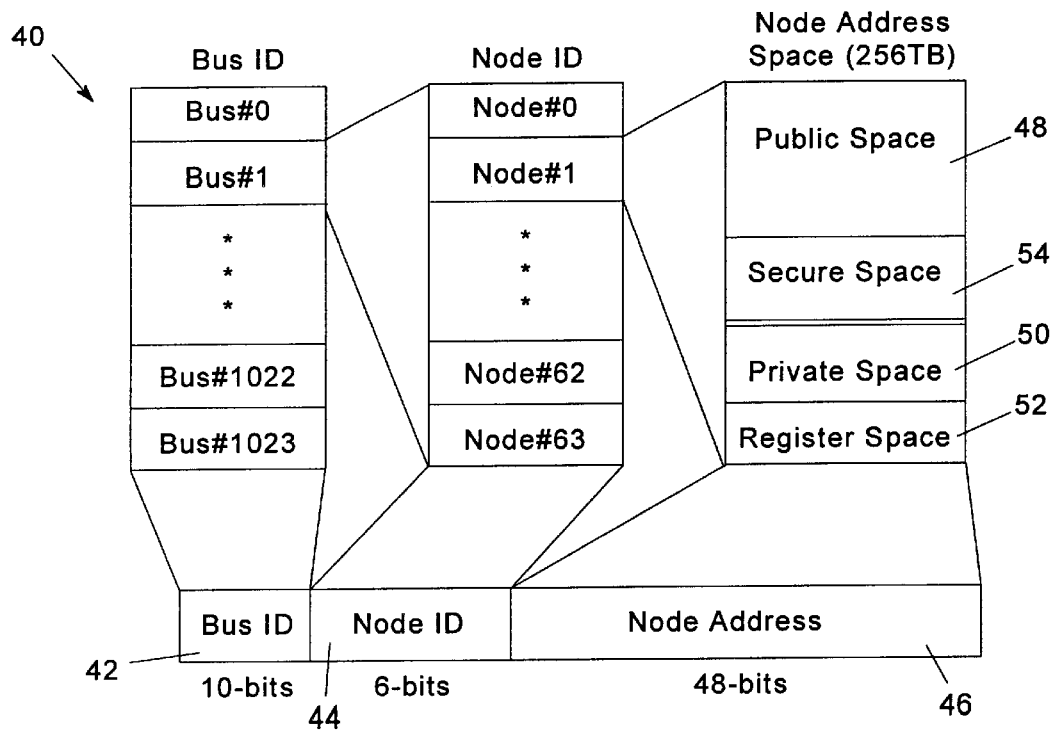
FIG. 2 is a block diagram of the memory space for a memory-mapped serial communications interface consistent with the invention.

As illustrated in FIG. 2, a memory address space 40 consistent with the IEEE 1394 specification may define a 64-bit addressing scheme. The ten most significant bits define a bus ID field 42 that logically separates the address space into 1024 logical buses, and a 6-bit node ID field 44 partitions each bus into 64 nodes. Each node is therefore allocated an address space of 256 terabytes (TB) by virtue of the 48-bit node address field 46. The IEEE 1394 specification typically segregates each node address space into a public space 48, a private space 50, and a register space 52.

Consistent with the invention, however, it may be desirable to partition a portion of the memory address space as a secure space 54, e.g., as a portion of the public space 48. This would permit, for example, only a portion of the memory address space to be secured, with the remainder of the addressing space available to all nodes regardless of their secured status. In the alternative, it may be desirable to restrict access to all of the address space allocated to a node, whereby secure space 54 would occupy all of public space 48. Moreover, it should be appreciated that other addressing schemes may be utilized in the alternative, and thus, the invention should not be limited to the particular addressing scheme illustrated in FIG. 2.

Figure 3:
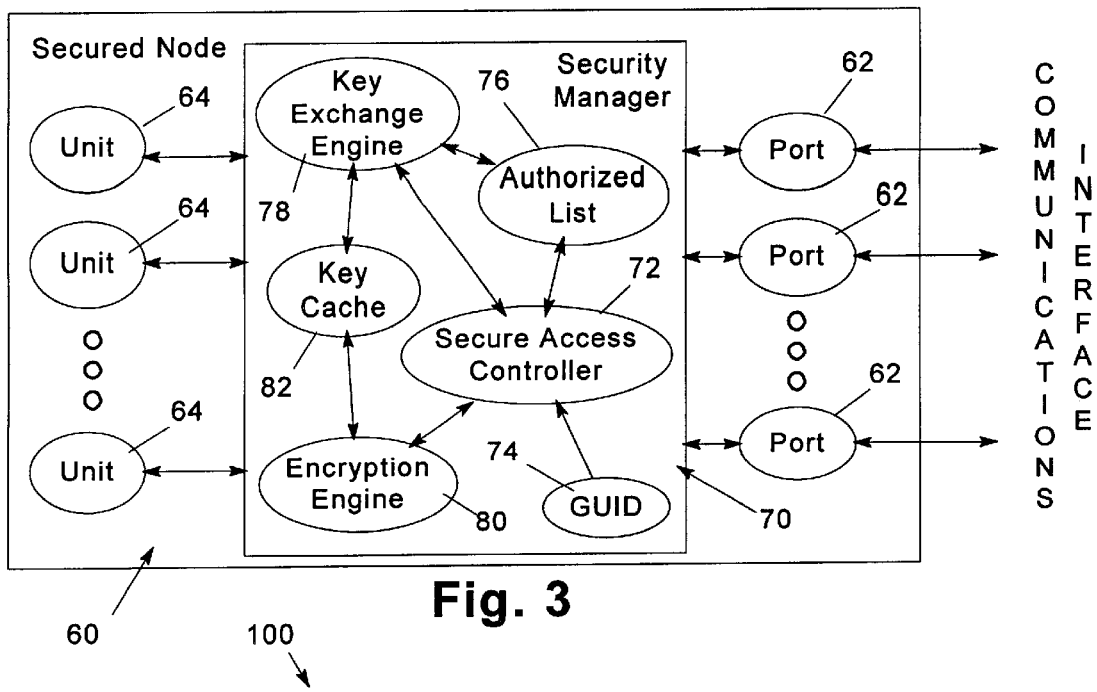
FIG. 3 is a block diagram of the primary components in a secured node consistent with the invention.

A representative secured node 60 is illustrated in greater detail in FIG. 3. Generally, each secured node may include a plurality of ports 62 that interface with a plurality of units 64. Each port 62 represent a physical connection for the serial communications interface, and each unit 64 represents a particular device that may be coupled to such a port, e.g., a processing device, a memory device, or an input/output (I/O) device, among others. Each unit typically operates independently or in conjunction with other units in the node, and each is typically controlled by its own software driver. Registers defined by a given unit are mapped into the node address space and are accessed by unit specific software drivers. To control access to one or more of units 64 via the communications interface, security manager 70 is interposed ports 62 and unit 64. A security manager consistent with the invention typically includes a secure access controller 72 which relies on a GUID 74 for the node, as well as an authorized list 76 that stores the information pertaining to the other nodes that are authorized to communicate with the secured node.

A first aspect of controlling access to a node is that of developing a list of secured nodes that are authorized to access the given node. Typically, such authorization may be provided using any number of conventional digital signature and/or certification mechanisms. For example, one particularly well-suited certification process utilizes a key exchange technique which is implemented in the illustrated embodiment using a key exchange engine 78. For example, one key exchange technique that may be used is the Diffie-Hellman algorithm, which is well known in the art. Other techniques for authorizing other secured nodes may be used in the alternative.

Another aspect of ensuring controlled access to a secured node is that of ensuring that communications between secured nodes via a secured communications link may not be intercepted and monitored by unauthorized nodes. Typically, some form of encrypting of the communications between secured nodes is utilized. In the illustrated embodiment, any number of encryption or cipher techniques may be used, e.g., among others, public-private key encryption techniques such as the RSA RC-5 stream cipher algorithm, or alternatively the DES block cipher algorithm (each of which is well known in the art). To encrypt communications between a pair of secured nodes, typically a session key is generated by key exchange engine 78 and stored in a key cache represented at 82. The session key is then utilized in encrypting communications to particular nodes using encryption engine 80. To maintain compatibility with the IEEE 1394 specification, only the data within packets is encrypted. Standard headers are maintained in unencrypted form so that legacy IEEE 1394 nodes can still retransmit the packets without modification even though the data in the packets cannot be comprehended by those nodes.

It should be appreciated that a wide variety of available authorization and encryption techniques may be utilized to control access to a secured node consistent with the invention. Moreover, the specifics of such techniques are generally known in the art, and thus, need not be described in greater detail herein.

Figure 4:
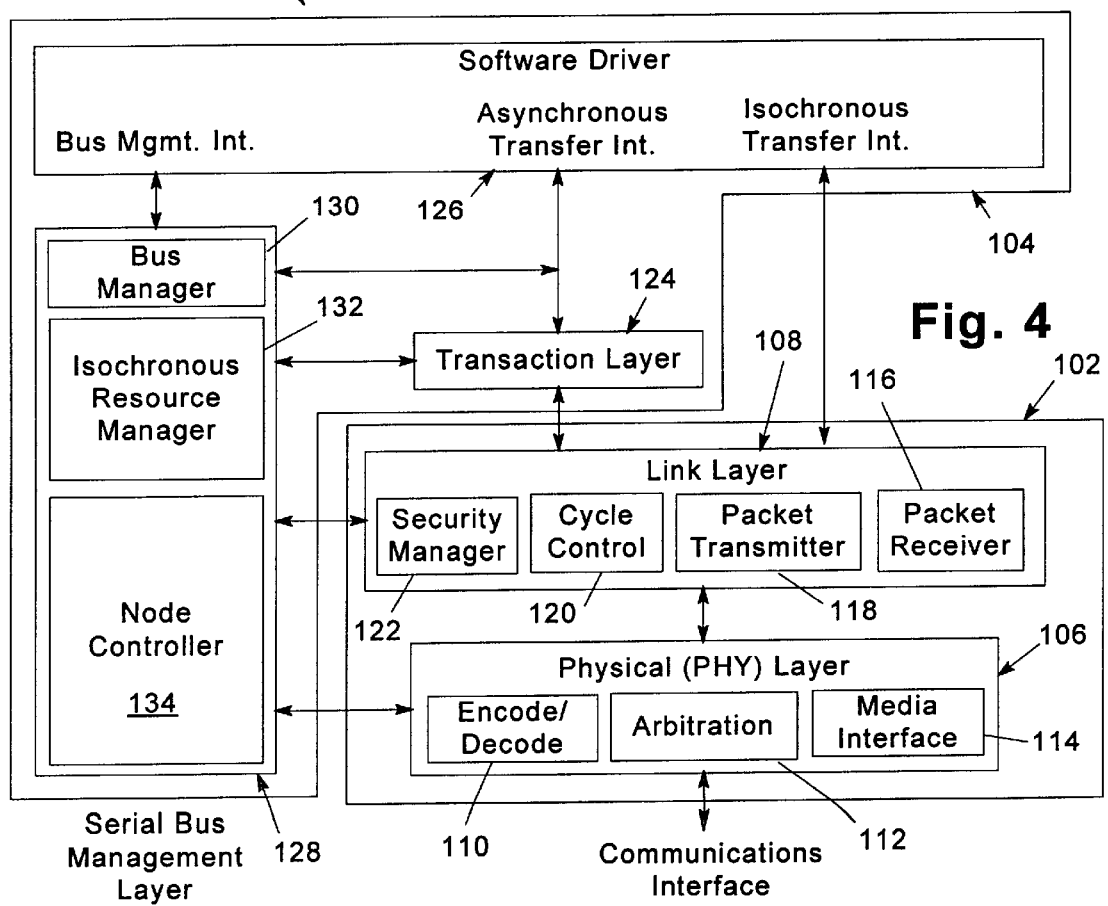
FIG. 4 is a block diagram of the primary software components in another secured node consistent with the invention.

FIG. 4 illustrates in another way a specific implementation of a secured node 100 consistent with the invention. Node 100 is illustrated as including a hardware-implemented integrated circuit device (chip) set 102 coupled to a software-implemented high-level interface 104 implemented in the firmware and/or operating system of an electronic device within which is defined the node.

Chip set 102 typically includes a physical (PHY) layer 106 and a link layer 108. Typically, but not exclusively, PHY layer 106 and link layer 108 are implemented in separate integrated circuit devices, although in some implementations, the same integrated circuit device may be utilized to implement both layers. PHY layer 106 provides the electrical and mechanical interface required for transmission and reception of packets transferred across the interface. The PHY layer also implements an arbitration process to ensure that only one node at a time transfers data across the communications interface. PHY layer 106 typically handles the functions of encoding and decoding (at 110), bus arbitration (at 112), and media interface (at 114), each of which is well understood in the art. Additional functionality, e.g., handling tree and self-identification after a bus reset, is also handled by PHY layer 106. In addition, PHY layer 106 typically rebroadcasts any packets received at one port to each other port available at the node so that each packet transmitted over the interface is distributed to all the nodes in the interface.

PHY layer 106 and link layer 108 pass therebetween symbols comprising the data within a given packet emanating from or destined for the particular secured node. In turn, link layer 102 communicates with higher protocol layers via packets or subactions comprising a plurality of such symbols. As such, link layer 108 typically includes the functions of a packet receiver 116 and a packet transmitter 118, as well as that of cycle control, illustrated at 120. In addition, in the implementation of FIG. 4, link layer 108 also implements a security manager 122 to provide controlled access to the higher-level software layers in node 100 in a manner consistent with the invention.

The software components illustrated at 104 define the higher-level protocols of the IEEE 1394 specification. Typically, such components are implemented in firmware and/or in the operating system of the electronic device in which the node is defined, as appropriate. Often, such layers are implemented within the electronic device, and thus are disposed in separate integrated circuit devices from the link and PHY layers. In the alternative, however, it should be appreciated that link layer 108 and/or PHY layer 106 may also be implemented in the same integrated circuit device(s) as the higher-level layers defined in block 104. Practically any combination and organization of integrated circuit and other hardware devices may be used to implement each of the IEEE 1394 protocol layers, and thus, other hardware implementations of each of the IEEE 1394 protocol layers will be apparent to one of ordinary skill in the art.

One higher-level layer implemented in block 104 is a transaction layer 124, which supports a request-response protocol for read, write, and lock operations related to asynchronous transfers over the communications interface. The transaction layer typically receives data transfer requests from applications executing on node 100 through a software driver 126. In response, such transfer requests are converted into one or more transaction requests that are need to complete the transfer.

Driver 126 also includes a facility for providing isochronous transfer directly with link layer 108. As is well known, the IEEE 1394 specification defines both asynchronous and isochronous communications. Asynchronous communications have guaranteed delivery and permit retries if a particular operation does not complete. Isochronous transfers, on the other hand, are guaranteed timing operations where late data is useless, and thus, retries are not permitted. For example, streaming data such as audio or video data typically must be guaranteed a certain amount of bandwidth to ensure a continuous delivery of data. As such, such data is typically transmitted via isochronous transfers in a manner well known in the art.

A serial bus management layer 128 is also supported in node 100 to support interface configuration and management activities for the node. The precise bus management support included are dependent upon the capabilities of the node. The serial bus management layer of each node typically must include configuration functions, while other bus management functions are optional (e.g., power management). For example, functions such as cycle master, isochronous resource management and/or bus manager may be implemented in one or more of a plurality of nodes coupled to the communications interface. As such, layer 128 may include, for example, a bus manager component 130 and an isochronous resource manager 132. Layer 128 may also include a node controller 134 that handles various housekeeping tasks for the node, including, among other tasks, segmenting resources and supporting IEEE 1212 configuration and status registers (CSR's).

It should be appreciated that other software layer organizations may be utilized in the alternative. Moreover, it should be appreciated that the security management function of security manager 132 may be implemented in any number of alternate layers to the link layer (e.g., in the transaction layer, the software driver and/or in the serial bus management layer). Moreover, as will become more apparent below, one particularly suitable alternate implementation of a security manager is in the PHY layer. This specific implementation is discussed in greater detail below.

In the illustrated implementation, an authorization list and a key cache for a node are maintained in a common data structure, such as a table 140, illustrated in FIG. 5. Table 140 includes an entry 142 for each authorized node in the authorization list. Each entry 142 typically includes a GUID-public key pair including GUID 144 and public key 146 that uniquely identifies an authorized node with which communication in a secure fashion is permitted with a particular node.

It is also desirable to include a session key 148 for each entry that is used to encrypt the communications between the node and other authorized nodes. In the illustrated embodiment, a new session key is generated each time the communications interface is reset, so that the encryption scheme between authorized nodes is changed on a regular basis, thereby heightening the security for the interface. As will be discussed in greater detail below, each session key is generated in a random fashion and is transmitted to an authorized node in encrypted form based upon the public key defined for that node. Subsequent data communications between a pair of authorized nodes are then encrypted using the session key.

In the illustrated embodiment, several classes of nodes are defined. A first class of node is a secured node, which is restricted to communicating with only specific nodes that are authorized for communication therewith. A second class of nodes is an unsecured, or legacy, node, that operates in the conventional manner defined by the IEEE 1394 specification. A third class of nodes is a selective-secured node, that can communicate under local control with all unsecured nodes, as well as with any secured or other selective-secured nodes as authorized. It should be appreciated that the selective-secured nodes and secured nodes in a communications interface typically include security managers that form a distributed firewall consistent with the invention.

Among the secured and selective-secured nodes, it may be desirable to define one or more types of such nodes based upon the manner in which such nodes are authorized for communication with other nodes. A first type of such a node is a self-directed node, which has an internal mechanism for authorizing another node in the interface for secured communications. Typically, no permanent authorization lists are typically contained in such nodes. Instead, authorization lists are generated dynamically by the nodes after a bus reset by polling for acceptable nodes on the interface. One manner of self-authorizing other nodes, for example, utilizes a third party certification process, e.g., using digital certificates available from Verisign or other trusted third party agencies.

One manner in which a self-directed node can authorize nodes is to enable certain classes of devices to be used with specific devices of a given manufacturer. One important implementation, for example, would be for ensuring the secure communication and prevention of copying of third party intellectual property. For example, the DIVX and DAT specifications respectively define standards for encrypting video and audio data to prevent such data from being copied by unauthorized parties. It may be desirable, therefore, in certain applications to restrict the receiver of an unencrypted DIVX or DAT transmission to be a particular player-only (non-recordable) type of device, so that the unencrypted data transmission by a DIVX or DAT player cannot be intercepted by a recordable device to defeat the original copy protection mechanism. Thus, for example, the manufacturer of a television or audio receiver could receive from the manufacturer of a DIVX or DAT player a certificate to be stored in the permanent memory of the television or audio receiver during manufacture so that the player may retrieve such a certificate from the television or receiver and establish a secure communications link therewith. Typically, the certificate would be encrypted with a public key for the television or receiver so that the certificate could not be intercepted and mimicked by unauthorized nodes.

Another type of secured or selective-secured node is an interactive-type node, which has a mechanism to build a permanent authorization list by asking an external resource whether or not located devices on the interface should be authorized for communication with the node. The external mechanism may be, for example, a display panel or combination of buttons that a user is required to supply input to manually determine which devices are authorized for communication with a particular node. Other external mechanisms may be, for example, an on-screen walk-through setup menu, a configuration or properties dialog box in a computer graphical user interface (GUI), a keypad, a telephone keypad, and other suitable known user input mechanisms.

A third type of secured or selective-secured node is a trusted interactive node, which is similar to an interactive node and which has an external mechanism to ask an outside resource whether or not to authorize a located device. However, unlike an interactive node, the trusted interactive node has the additional functionality of being able to assist a fourth type of node, a directed node, in building its own authorization list. Trusted interactive nodes, therefore, act as supervisors for directed nodes, in essence "blessing" such nodes for communication with other nodes in the interface.

A trusted interactive node typically informs a directed node of what other nodes the directed node can communicate with in a secured fashion. Typically, some external mechanism, such as a pass phrase, may be required to be transmitted by the trusted node to the directed node to create a secure channel for communicating the authorized nodes with which the directed node may communicate. The pass phrase may be input to the trusted node automatically or manually by a user, with the trusted interactive node passing the pass phrase to each directed node to establish a secure link, and then passing authorized entries with which such directed nodes may communicate.

One example of a trusted interactive and directed node pair may be, for example, a computer and a disk drive. A disk drive of a directed type might include with its packaging a printed sheet with the pass phrase that is required to unlock the device. Then, when the disk drive is coupled to a computer (operating as a trusted interactive node), the computer detects the presence of the disk drive and requests that the user input into the computer the pass phrase supplied with the drive. Then, once the user inputs the pass phrase, the computer establishes a secure communication link with the disk drive using the pass phrase. With the secure communications link established, the computer then transmits to the disk drive a list of other devices coupled to the computer with which secured communication is permitted.

It should be appreciated that other mechanisms for establishing an authorization list in a secured node may be utilized in the alternative. Other modifications will be apparent to one of ordinary skill in the art.

Typically, a communications interface consistent with the invention operates in three primary modes of operation. First, in an authorization mode, any time a new selective-secured or secured node is added to the communications interface, and which does not have an authorization list created therefor, a public key/GUID pair is passed with other nodes to authorize certain nodes for communication with one another. The authorization mode will differ for different types of nodes. For example, for a self-directed node, no permanent authorization lists are needed, and updating does not apply. For an interactive or trusted interactive node, the node has an external mechanism to obtain authorization from a user as to whether or not to grant authorization to a new node. For a directed node, the node asks its bound trusted node for permission to grant authorization to a new node.

Another mode of operation supported by the communications interface is that of a key exchange mode, which occurs anytime a bus reset occurs and two or more nodes are authorized. After a bus reset event, the key cache is dumped in each node, and once normal arbitration begins, nodes poll other nodes for their GUID/public key pairs. Any match with a node on the authorization list begins a session key generation process that uses a public key associated with the GUID to establish a secure session.

A third mode is that of secure data exchange where secure connections are encrypted with the session keys generated during the key exchange mode.

It should be appreciated that other types of secured and selective-secured nodes may be supported, as may other methods of establishing an authorization list to communicate with other nodes on a communications interface. Moreover, it should be appreciated that other modes may be defined, may of which are irrelevant to an understanding of the invention. Other modifications will be apparent to one of ordinary skill in the art.

FIG. 6 illustrates a bus reset routine 150 processed by a interactive, trusted or directed type selective-secured or secured node in response to a bus reset condition. It should be appreciated that, for example, with the IEEE 1394 specification, a bus reset is generated in response to addition or removal of a node from the interface. A bus reset may also be generated during the standard initialization that occurs upon initial power up of the interface.

Bus reset routine 150 begins in blocks 152 and 154 by performing tree ID and self ID phases to configure the interface, in a manner defined by the IEEE 1394 specification. Once these phases have been implemented, control passes to block 156 to determine whether security is enabled for the node, e.g., through checking a security enabled flag resident in the node. If security is not enabled, control passes to block 158 to enable the link layer of the node in a conventional manner, whereby, as illustrated at block 160, the node is ready to handle standard 1394 communications.

Returning to block 156, if security is enabled, however, control passes to block 162 to initialize any secure sessions. Once such sessions are initialized, the node is ready to handle secure 1394 communications, as illustrated at block 164.

For a interactive, trusted or directed node that has not been enabled for secured communications, typically some external mechanism must be utilized to initiate the authorization mode for the node to enable the node for secured communications. For example, as illustrated in FIG. 6, in response to receipt of some form of external input while in an unsecured mode (represented at block 160), a build authorization list routine 166 may be called to initiate the authorization mode for the node.

The manner in which an authorization list is built for a particular node varies depending upon the type of the node. For example, FIG. 7 illustrates an implementation of build authorization list routine 166 for use with an interactive or trusted type node. Routine 166 is typically called in response to an external poll request, e.g., upon powering up an electronic device a first time, or during a setup procedure initiated by a user, among other manners. Routine 166 begins in block 168 by initiating a loop that sequentially checks each available node accessible via the communications interface to determine whether such a node is a secure-enabled node. The poll response will typically include the GUID of the node. In addition, if the polled node is a secure-enabled node, the poll response will also include the public key for the node.

After issuing the poll request, block 168 passes control to block 170 to determine whether the last pass through the loop was the last node on the interface (and thus, that no poll request was performed). If no additional nodes remain to be processed, block 170 terminates the routine. However, for each unprocessed node, control passes from block 170 to block 172 to determine whether the node is secure-enabled. If not, control returns to block 168 to process the next unprocessed node.

If, however, the node is secure-enabled, control passes to block 174 to query an external source as to whether access to this node should be permitted, e.g., through a display and pushbutton interface on the electronic device, or any other manner described above in connection with the description of an interactive node. Based upon the result returned, block 176 then passes control back to block 168 to process additional nodes (if access should not be permitted to this node), or to block 178 to update the authorization list to add the public key and GUID of the polled node, thereby authorizing secure communications with the polled node.

Next, block 180 determines whether this is the first node added to the authorization list. If so, control passes to block 182 to set a security enabled flag so that this node is enabled for secure communications. Control then returns to block 168 to process additional nodes. Returning to block 180, if this is not the first node added to the authorization list, control passes directly to block 168 (as the flag is already set). Once all nodes have been processed, routine 166 is complete.

Figure 8:
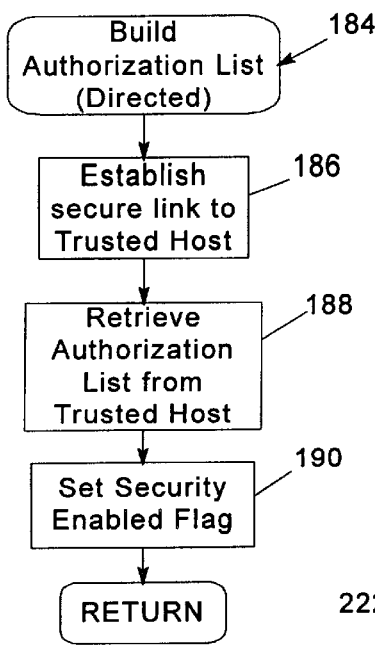
FIG. 8 is a flowchart illustrating the program flow of an alternate build authorization list routine to that of FIG. 7, for use in a directed node.

FIG. 8 illustrates a build authorization list routine 184 that may be used as an alternate to routine 166 for a directed type node. As discussed above, a directed node relies on another, trusted node to supply the node with its authorization information. Routine 184 is typically called in response to the input of a pass phrase to the directed node via a message passed by another node desiring to be the trusted node therefor. Routine 184 begins in block 186 by establishing a secure link with the trusted host, e.g., by passing its public key to the trusted node in response to receipt of an authorized pass phrase therefrom, then receiving from the trusted host a session key that has been encrypted with the public key for the directed node. Next, in block 188, the trusted host forwards to the directed node a GUID/Public Key pair for each node that is to be authorized to communicate in a secure fashion with the directed node, so that the directed node can create an authorization list entry for each such node. It should be appreciated that the trusted node may determine what information to send using a similar external mechanism as the trusted node builds its own list, among other alternatives. It should also be appreciated that the trusted node may either send an authorization list entry for itself at this point, or the directed node may have already added such an entry based upon the receipt of the pass phrase from the trusted node.

Once the authorization list has been passed to the directed node, control passes to block 190 to set the security enabled flag for the directed node. Routine 184 is then complete.

Figure 9:
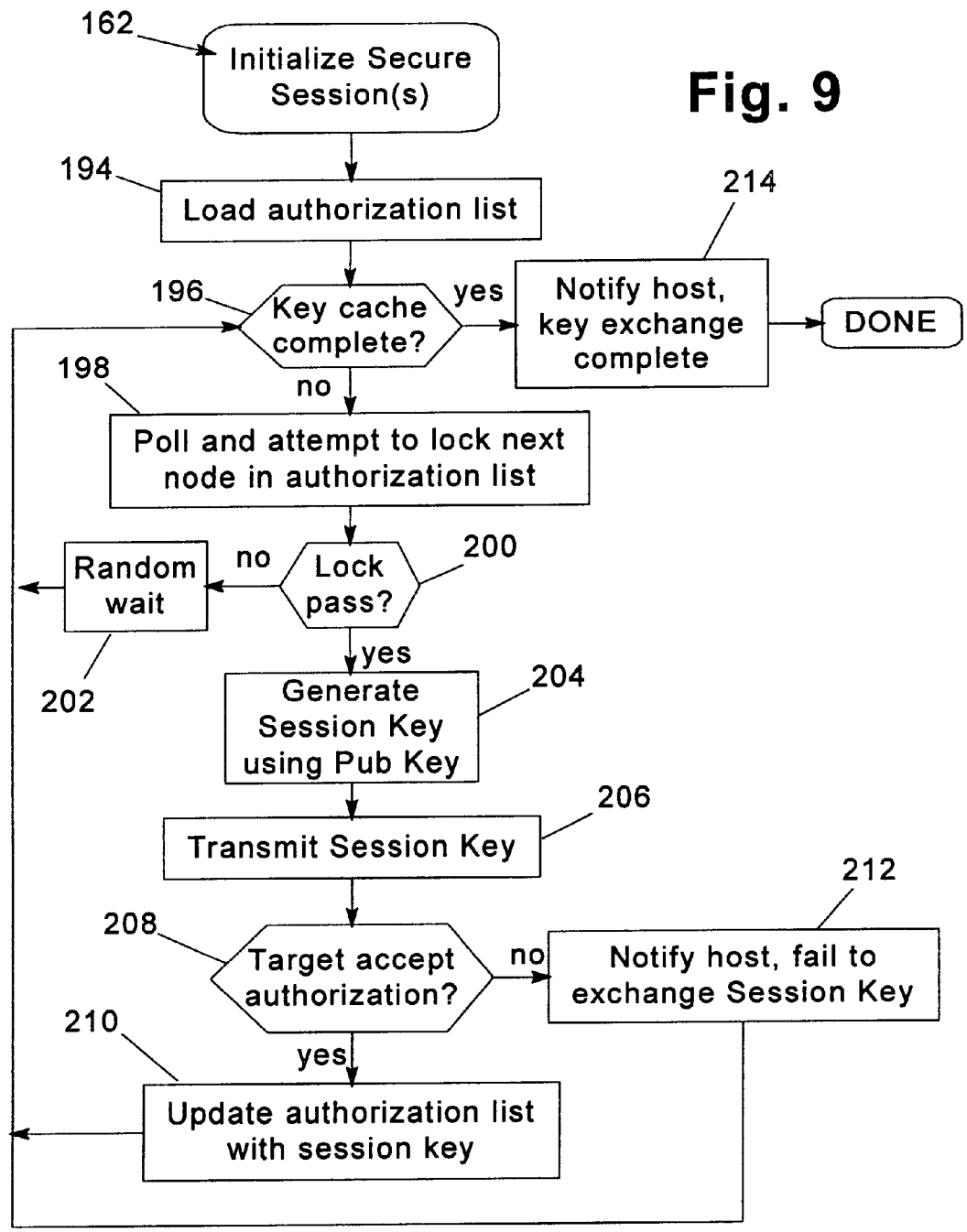
FIG. 9 is a flowchart illustrating the program flow of the initialize secure sessions routine of FIG. 6.
Figure 13:
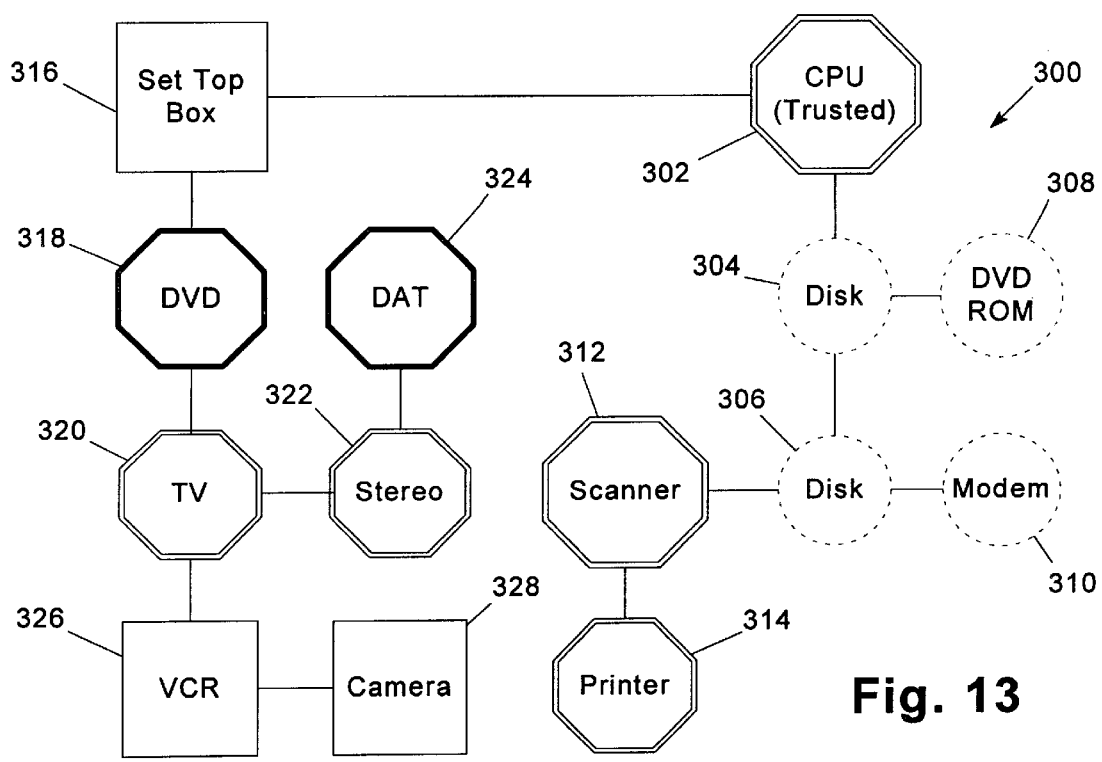
FIG. 13 is a block diagram of an exemplary memory-mapped serial communications interface consistent with the invention, illustrating the physical links formed between a plurality of nodes.
Figure 14:
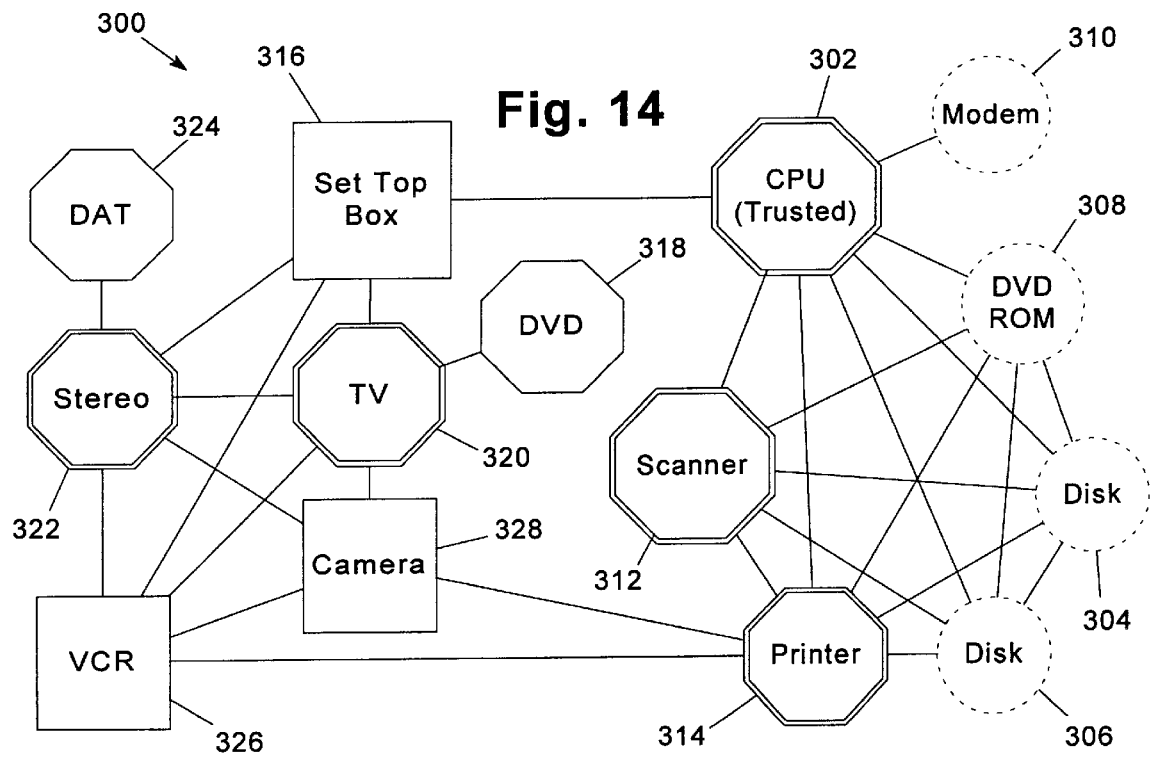
FIG. 14 is a block diagram of the memory-mapped serial communications interface of FIG. 13, illustrating one suitable arrangement of logical communications links formed between the plurality of nodes.

Returning to FIG. 6, as discussed above, if the security enabled flag is set for a node, control passes to an initialize secure sessions routine 162 to enter the key exchange mode for the node. As shown in FIG. 9, initialize secure sessions routine 162 begins at block 194 by loading the authorization list for the node.

Next, a loop is initiated in block 196 to process each entry in the authorization list to essentially fill a cache of session keys (the key cache) for use in establishing secured communications with the various nodes in the authorization list. Thus, for each entry in the authorization list, control passes to block 198 to poll and attempt to lock the node associated with the next authorization list entry (referred to as a "target node". Typically, the node attempts to establish a communications link with the node represented by the next authorization list entry by passing thereto a lock transaction including the public key stored in the authorized list entry.

Next, control passes to block 200 to determine whether the lock attempt was successful. If not successful, control passes to block 202 to wait for a predetermined period of time, as it is likely that the target node is busy processing an attempt by another node to establish a secure session therewith. After waiting a random period of time, control then returns to block 196 to process additional entries in the authorization list.

Returning to block 200, if the node obtains a lock on the target node, control passes to block 204 to generate a session key using the pubic key stored for the target node. The session key is typically generated randomly and then encrypted using the public key for the target node so that the session key cannot be intercepted by an unauthorized node. The session key is used to encrypt the data in secured packets transmitted between the nodes, in a manner well known in the art. It should be appreciated that the session key may be permanently associated with a target node rather than randomly generating a new session key upon the initiation of a new session. However, by randomly generating a session key for each new communication link, a greater degree of security is provided thereby. Moreover, it should be appreciated that, for example, for isochronous communications, a single session key may be generated once and used for multiple target nodes for which it is desired to broadcast an isochronous communication. The common session key, however, would be uniquely encrypted for each target node by virtue of the unique public key for each target node.

Once a session key is generated and encrypted, the encrypted session key is transmitted to the target node in block 206. Next, in block 208, the node determines whether the target node accepted the authorization attempt. If successful, control passes to block 210 to update the authorization list entry for the target node to include the current session key. Control then returns to block 196 to process additional entries. However, if not successful, block 208 passes control to block 212 to notify the host for the node (e.g., the operating system) that the attempt to exchange a session key with another node failed. Control then passes to block 196 to process additional authorization list entries.

Once each entry in the authorization list has been processed, block 196 passes control to block 214 to notify the host that the key exchange operation is complete. At this point, all secure sessions with authorized nodes in the authorization list have been established, whereby routine 162 then returns to routine 150 to transition to the secure data exchange mode and thereby accept secured communications.

Figure 10:
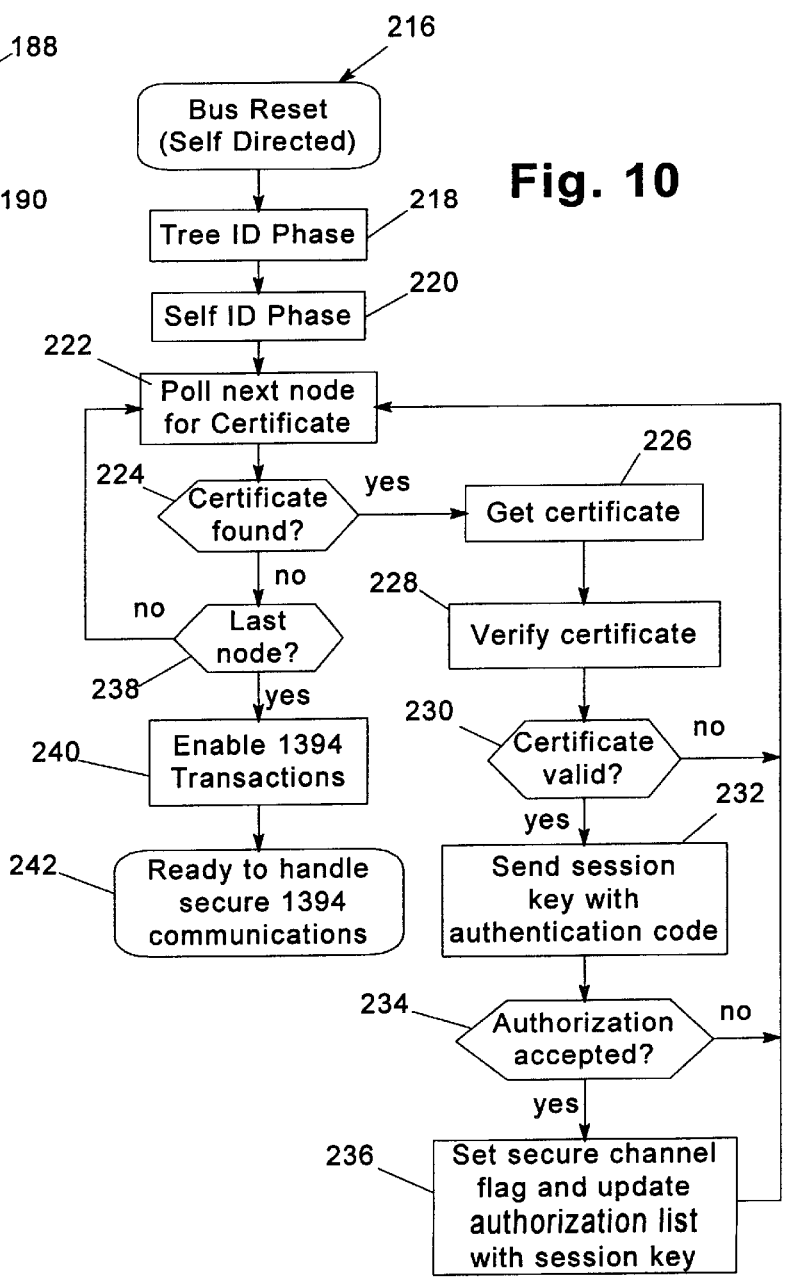
FIG. 10 is a flowchart illustrating the program flow during a bus reset operation for a self directed secured node consistent with the invention.

As discussed above, routine 150 is suitable for use with all node types except self directed nodes. For these latter nodes, an alternate authorization procedure is utilized to dynamically build an authorization list in response to a bus reset. For example, one suitable routine 216 performed in response to a bus reset operation is illustrated in FIG. 10. Routine 216 begins in blocks 218 and 220 by performing the tree ID and self ID phases of the IEEE 1394 initialization process. Next, in block 222, a loop is initiated to poll each available node on the communications interface for a third party certificate. As discussed above, the third party certificate indicates whether another node has been authorized to communicate with a particular class of self directed node. The certificate typically is encrypted with the public key for the self-directed node so that other nodes cannot intercept a valid certificate and gain access to the self directed node.

After a poll request has been issued, control passes to block 224 to determine whether a certificate was returned by the polled node. If so, control passes to block 226 to get the certificate, and then to block 228 to verify whether the certificate is a valid certificate for the self directed node (e.g., by decrypting the certificate and comparing it with a particular list of valid certificates). Next, if the certificate is not valid, block 230 returns control to block 222 to process the next node, as no secure communications will be permitted with the present node. If the certificate is valid, block 230 passes control to block 232 to pass a session key to the target node with an authentication code. Next, block 234 determines whether the authorization has been accepted by the target node—i.e., whether the session key and the authentication code have been accepted. If not, control returns to block 222 to process additional codes. If so, however, control passes to block 236 to set a secure channel flag and update the authorization list to add an entry for the target node, including the GUID/Public Key pair therefor and the session key generated in the self directed node. Control then passes back to block 222 to process additional nodes.

Once all nodes have been processed, block 238 will pass control to block 240 to enable 1394 transactions. Then, as illustrated in block 242, a transition occurs from the authorization and session key exchange modes (represented by the loop of blocks 222–238) to the secure data exchange mode, whereby the self directed node is ready to handle secure 1394 communications.

FIGS. 11 and 12 respectively illustrate suitable packet transmission and reception routines that may be utilized by a secured node once in the secure data exchange mode, regardless of the type for the node. As shown in FIG. 11, one suitable packet transmission routine 244 begins in block 246 by preparing to transmit data in the link layer—typically by building a data packet in a manner well understood by those knowledgeable of the IEEE 1394 specification. Next, block 248 determines whether the target node(s) for the prepared data is in the authorization list for the node. It should be appreciated that multiple target nodes may exist, e.g., if using an isochronous or broadcast communication.

If so, control passes to block 250 to obtain from the authorization list the session key, and optionally a cipher type (if multiple encryption engines are supported), for each target node for the prepared data. Then, in block 252, the clear data in the data block portion of the data packet is encrypted using the session key and cipher type, and the data packet is then sent as an IEEE 1394 transaction in block 254, whereby transmission of the data packet is complete. It should be appreciated that it is often beneficial to only encrypt the data block portion of a packet, leaving the header intact, so that other nodes can process and forward the data packet irrespective of whether they are on the authorized list for the source node—thus ensuring compatibility with legacy IEEE 1394 nodes.

Returning to block 248, if a target node for a data transmission is not on the authorization list, no secure communications are permitted therewith. However, in certain circumstances, a source node may be a selective-secured node, and thus may communicate in a conventional, non-encrypted manner with other nodes in the communications interface. A node may be set as selective-secured in several different manners, e.g., through a preprogrammed or hard-wired setting, or through a user configurable option or property for the node.

Thus, if block 248 determines that a target node is not in the authorization list, control passes to block 256 to determine whether the node is selective-secured or secure only. If the node is selective-secured, control passes to block 258 to send the data packet as a conventional 1394 data transaction with clear (non-encrypted) data, whereby transmission of the data packet is complete. If the node is secure only, however, control passes to block 260 to notify the host that the target resource is unavailable for communication prior to completing the routine, e.g., by passing an acknowledge response character to the host such as an acknowledge data error code or an acknowledge conflict error code. Other manners of indicating to a host that a resource is unavailable may be used in the alternative, e.g., using other acknowledge codes or response codes.

Similarly, FIG. 12 illustrates a suitable packet reception routine 262 that begins in block 264 by receiving a data packet in the link layer. Next, block 266 determines whether the source node from which the data packet emanated is in the authorization list for the node.

If so, control passes to block 268 to first check whether the source node is attempting to lock the present node and pass a session key thereto—i.e., whether the source node is attempting to initiate a secured link with the present node. If so, control passes to block 270 to update the authorization list entry for the source node with the session key passed in the data packet, whereby secure communications with the source node are then enabled. Control then passes to block 272 to send an "OK" acknowledgment to the source node, thereby indicating that the authorization attempt was received and accepted. Routine 262 is then complete.

Returning to block 268, if the source node is not attempting to pass a session key, control passes to block 274 to determine whether the session key is valid. Since session keys are recreated after each bus reset, this operation determines whether a new session key has been exchanged with the source node since the last bus reset operation. Prior to such exchange, no secure communications should be permitted. Determining whether a session key is valid, for example, may be performed by setting flags at the onset of a bus reset, and then clearing such flags as new session keys are stored in various authorization list entries, among other manners.

If the session key is valid, control passes to block 276 to obtain the cipher type (if multiple encryption engines are supported) and session key for the source node from the authorization list. Then, block 278 receives the cipher data block from the data packet and decrypts the cipher data block into clear data, in a manner well known in the art. An "OK" acknowledgment is then passed back to the source node in block 280 to acknowledge receipt of the data packet, and routine 262 is complete.

Returning to block 274, if the session key is not valid, a "NAK" (no acknowledgment) signal is returned to the source node in block 282 to reject the data packet, as a current session key has not yet been exchanged since the last bus reset. Routine 262 is then complete.

Now returning to block 266, if the source node is not on the authorization list, no secure communications are permitted therewith. Thus, control passes to block 284 to determine whether the node is selective-secured or secure only. If the node is selective-secured, control passes to block 286 to receive the data packet as a conventional 1394 data transaction with clear (non-encrypted) data, whereby reception of the data packet is complete. If the node is secure only, however, control passes to block 288 to notify the host to abort the reception of the data packet, e.g., in any of the manners described above for indicating that a resource is unavailable, such as passing an acknowledge response character to the host, among others.

Various modifications may be made without departing from the spirit and scope of the invention. For example, an authorization list may be permanently stored in a node, or may be dynamically recreated for the node in response to a bus or power on reset. Similarly, a session key may also be permanently stored or dynamically recreated for any given node. Moreover, multiple encryption engines and protocols may be supported, whereby an engine indicator may also be stored in each authorization list entry.

In addition, it may be desirable to determine whether a transmitted packet should be secured or not by analyzing the target address for the packet. As discussed above, for example, the public memory address space for a node may be partitioned into secure and non-secure spaces, whereby a determination of whether a packet will be transmitted or received in a secure fashion will depend on the target address for the packet.

It should also be appreciated that either or both asynchronous and isochronous secure transmissions may be supported in a node. For an isochronous transmission, a session key would typically be transmitted to each authorized receiver node using an already secure asynchronous packet to enable each receiver to decrypt an isochronous transmission.

Other modifications will be apparent to one of ordinary skill in the art.

As an exemplary application of a distributed firewall consistent with the invention, FIG. 10 illustrates one suitable layout for a plurality of nodes coupled to one another in a memory-mapped serial communications interface 300 consistent with the invention. In this figure, unsecured nodes are identified with squares, secured nodes are identified with circles, and selective-secured nodes are identified by octagons. Moreover, interactive nodes are identified by double-line borders, and directed nodes are identified by dashed outlines. Bolded lines are used to identify self-directed nodes.

A computer CPU node 302 defines a trusted interactive node to which is bound a plurality of directed nodes 304, 306, 308 and 310. Nodes 304 and 306 are disks, node 308 is a DVD ROM drive, and node 310 is a modem, e.g., a cable modem or other network-type interface. In addition, interactive nodes 312 and 314 are defined for a scanner and a printer, which are daisy-chained to disk node 306.

CPU node 302 is also linked to a set top box node 316, which is an unsecured node. This box is, in turn, coupled to a self-directed DVD node 318 (having a copy protection mechanism), and then to an interactive television node 320. Television node 320 is coupled to a daisy-chained arrangement of legacy nodes 326, 328, representing a VCR and a camera. Television node 320 is also linked to a stereo (audio receiver) node 322, which is an interactive-type node. In turn, a DAT node 324, which is self-directed, is coupled to node 522.

With the arrangement of nodes shown in FIG. 10, if all of the nodes were conventional unsecured nodes, any node would be permitted to control and/or access data from any other node. Several concerns would be raised in such a circumstance. For example, modem node 310 would have the ability to command and access data from any other node. Thus, were an unauthorized entity able to link with the modem node, every other node would be susceptible to hacking by that entity. As another example, it would be possible for a recordable device such as VCR 326 or either of disks 304, 306 to "listen" and record unencrypted video and/or audio signals passed by DVD 318 and/or DAT 324 to player devices such as television 320 and stereo 322, thus defeating the copy protection for any third party intellectual property.

However, by utilizing a distributed firewall consistent with the invention, a number of unique possibilities exist for defining controlled access to various nodes to address the concerns raised by conventional IEEE 1394 interfaces. For example, one suitable logical connection layout for communications interface 300 of FIG. 10 is illustrated in greater detail in FIG. 11. Logical connections identifying authorized communication links between selected nodes are identified by lines extending between such nodes in this figure. For example, it may be desirable to permit each of nodes 302, 304, 306, 308, 312 and 314 to communicate with any other such node. However, it may be desirable to limit access to modem node 310 to solely the trusted CPU node 302, so that the modem is not permitted to access other components coupled to the interface directly. As a result, access through the modem may be carefully controlled via CPU 302.

It may also be desirable for CPU node 302 to communicate with set top box node 316. This node may also be permitted to communicate with television node 320, stereo node 322 and VCR node 326. Each of these nodes may also be permitted to communicate with one another, as well as each with camera node 328. Moreover, it may be desirable to permit VCR node 326 and camera node 328 to directly communicate with printer 314, e.g., so that images from the VCR or camera may be directly printed by the printer.

As also may be seen from this figure, DVD node 318 is coupled solely to television node 320, and DAT node 324 is connected solely to stereo node 322, thus ensuring that copy-protected data stored on these nodes cannot be intercepted and recorded, e.g., by VCR node 326 or either disk node 304, 306. As such, the copy protection mechanisms is protected from being defeated by an unauthorized node.

It should be appreciated that the communications interface illustrated in FIGS. 10 and 11 is merely exemplary in nature, and an innumerable number of alternate configurations may be envisioned. In fact, given the unique flexibility afforded by distributed firewalls consistent with the invention, a wide variety of security features may be implemented in different such interface implementations.

Implementation of a Security Manager in a Secure PHY Integrated Circuit Device

Although a security manager may be implemented in any number of protocol layers in a memory-mapped serial communications interface, one particularly useful implementation utilizes a security manager in the PHY (physical) layer of a communications interface such as the IEEE 1394 interface.

Figure 15:
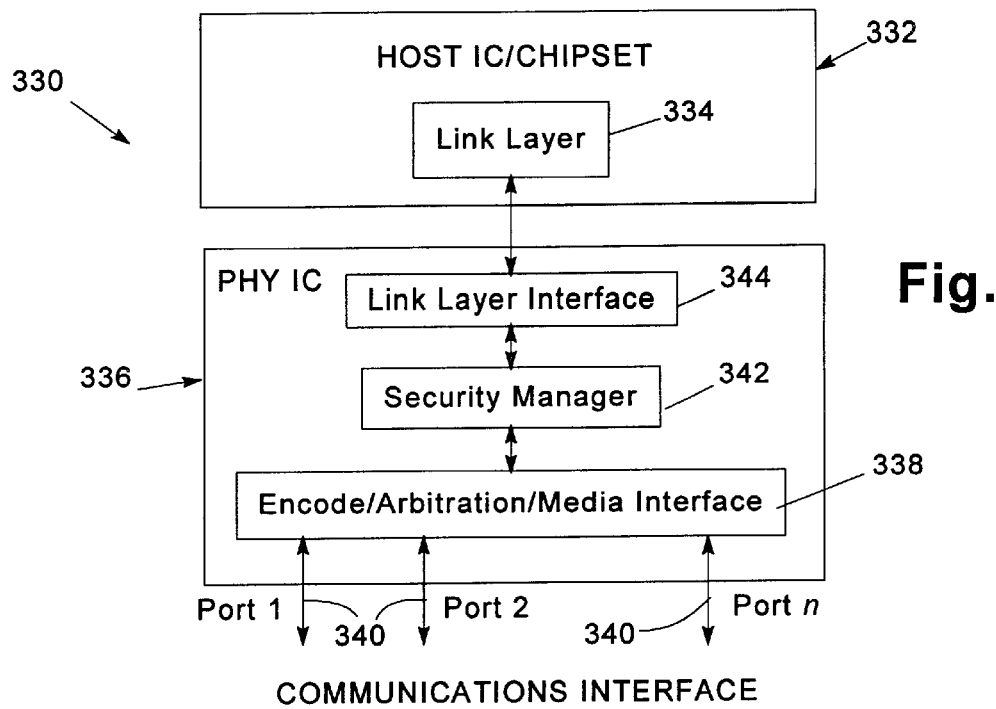
FIG. 15 is a block diagram of an electronic device utilizing a secure-enabled PHY integrated circuit device consistent with the invention.

For example, as illustrated in FIG. 15, a secure node 330 may be implemented using a host 332 (including a link layer 334) interfaced with a communications interface via a PHY integrated circuit device 336. In addition to the encode, arbitration and media interface functionality required by the IEEE 1394 specification (represented by block 338) to interface with any number (n) of ports 340, device 336 also implements a security manager 342 consistent with the invention, interposed between block 338 and a link interface 344. The security manager serves to support secure communications in its associated local node(s) by selectively restricting the flow of data packets between link layer 334 and the communications interface.

Host 332 may represent a single integrated circuit device (e.g., a "system on a chip"), or may represent a chipset comprising multiple integrated circuit devices. As should be apparent to one of ordinary skill in the art, by implementing the security manager in the PHY layer, the host need not be aware of or specifically designed to operate in accordance with any security protocol. As a result, the host may often be implemented using circuitry that need only comply with the conventional IEEE 1394 specification. Little or no modification would be required thereto to operate the node in a secure mode, thus making a secure PHY device readily suited for use in retrofitting existing designs to operate as secured nodes. Consequently, the design and manufacturing costs associated with implementing secure communications in the manner described herein may be significantly reduced.

Implementation of a security manager in a PHY layer device utilizes the basic principles described above with respect to FIGS. 1–12, with a few exceptions necessary for the PHY-specific implementation (discussed below) given that at the PHY layer of the IEEE 1394 specification, information is handled on a bit-by-bit basis rather than on a packet-by-packet basis (as with the link layer). Also, compared to a conventional IEEE 1394 PHY layer implementation, it will be appreciated that implementation of a security manager in a PHY layer consistent with the invention may require additional circuitry in the PHY layer, e.g., volatile or non-volatile memory within which to store an authorization list and key cache, packet buffers to buffer data for use by an encryption engine, CRC checksum corrupting circuitry, and other support circuitry that will be apparent to one of ordinary skill in the art.

Figure 16:
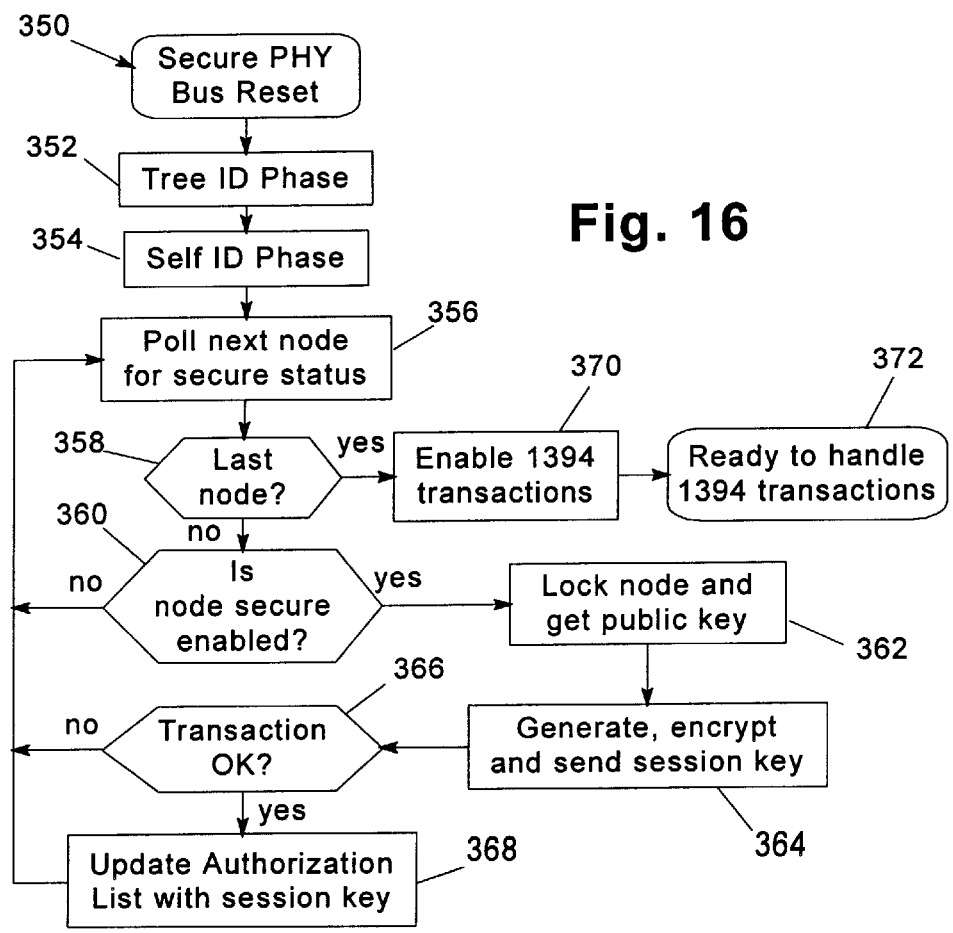
FIG. 16 is a flowchart illustrating the program flow during a bus reset operation for the electronic device of FIG. 15.

FIG. 16 illustrates, for example, a suitable bus reset handling routine 350 for use in secure PHY integrated circuit device 336. Routine 350 begins in blocks 352 and 354 by performing the tree ID and self ID phases of the initialization process, in a manner well known in the art. Next, block 356 initiates a loop to poll each node accessible in the communications interface for its secure status. As long as additional nodes remain to be processed, block 358 then passes control to block 360 to determine whether a polled node is secure enabled. If not, control returns to block 356 to process additional nodes. If so, however, control passes to block 362 to attempt to lock the polled node and obtain its public key. Once this operation is complete, control passes to block 364 to generate, encrypt and transmit a session key to the polled node. Next, block 366 determines whether the session key was accepted, and if so, to update the authorization list to include an authorization list entry for the polled node (with the generated session key therefor). Control then passes to block 356 to process additional nodes.

Returning to block 366, if the session key was not accepted (i.e., the transaction was not "OK"), control returns directly to block 356 to process additional nodes. It should be appreciated that a session key may not be accepted for a number of reasons. For example, the polled node may not be authorized to communicate with this node, whereby a "NAK" response would be received, thereby preventing secure communications with such a node.

Once each node has been polled, block 356 passes control to block 370 to enable 1394 transactions, whereby, as illustrated in block 372, 1394 transactions are ready to be transmitted and received as necessary. Routine 350 is then complete.

It should be appreciated that the transmission and reception of secure packets in the secure PHY integrated circuit device may follow the same general flow as routines 244 and 262 of FIGS. 11–12, with only minor modifications thereto. For example, in a PHY implementation, block 246 of the packet transmission routine would not be implemented in the PHY device, rather, the data packet would be received from the link layer. Moreover, notification of the host (here the link layer) of an unavailable target may be performed, for example, by first corrupting the header CRC for the outgoing packet so that no that the target node will not accept the packet, and then returning a suitable acknowledgment response code (e.g., an acknowledge conflict error code) to the link layer so that the link layer and any higher protocol layers will not attempt to retry the unsuccessful packet transmission. Other manners of inhibiting the link layer from retrying the packet transmission may be used in the alternative.

Figure 17:
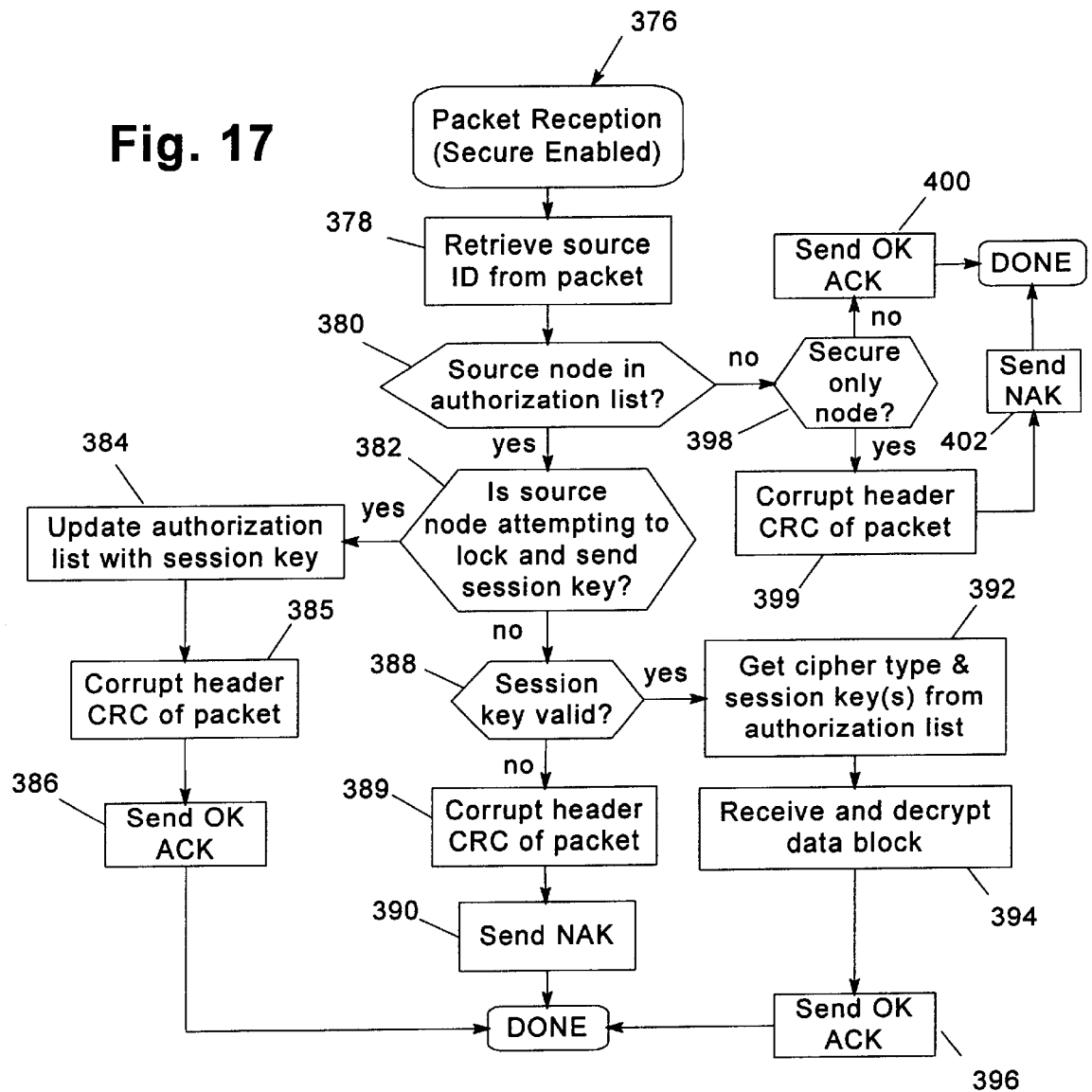
FIG. 17 is a flowchart illustrating the program flow of a packet reception routine for use in the security manager in the electronic device of FIG. 15.

FIG. 17 illustrates a suitable packet reception routine 376 for use by security manager 342. As discussed above with respect to routine 262 of FIG. 12, typically the host of a secured node must be notified to abort reception of a secure communication from an unauthorized node. In a PHY implementation, notification of the host to abort reception may be implemented, for example, by modifying or corrupting an incoming data packet in such a manner that the link layer will disregard the data packet. A significant advantage of this approach is that the link layer may be configured according to the conventional IEEE 1394 specification, yet can still interact with the secure PHY integrated circuit device without any special support for secured communications. This is because corrupting a data packet in the manner described herein results in the link layer simply disregarding the corrupted data packet. As a result, acceptance of the data packet is effectively inhibited in the link layer without any special processing in the link layer.

Modifying or corrupting a data packet to inhibit acceptance thereof by the link layer may take a number of forms consistent with the invention. For example, the CRC checksum in either or both of the header or data block of a packet may be modified prior to passing the packet to the link layer. As is well known in the art, an IEEE 1394 link layer will typically disregard any transmissions having an invalid CRC checksum. Thus, by simply corrupting either checksum, e.g., by encrypting or leaving off the received CRC (among other manners), the link layer will simply disregard the packet. Moreover, if the header CRC is corrupted, the secure PHY device may also be configured to terminate transmission of the remainder of the data packet. Other manners of causing the link layer to disregard a data packet may be used in the alternative.

As one example, packet reception routine 376 is illustrated in FIG. 17. Routine 376 is typically implemented in a sequencer that analyzes the data transmission of a packet, indicated as destined for a local node in the electronic device, from block 338 to link interface 344 (FIG. 15). It should be appreciated that routine 376 in this implementation does not handle the actual transmission of data from block 338 to block 344, nor does the routine handle detection that the data packet is destined for a local node in the device. Routine 376 does, on the other hand, have the ability to monitor the data transmission, as well as to modify the transmitted data. By restricting routine 376 to these functions, deviations from the IEEE 1394 specification are minimized, and compatibility with the interface between the PHY and link layers is ensured.

Routine 376 begins in block 378 by retrieving the source identifier from a transmitted data packet being forwarded to the link layer. Next, block 380 determines whether the source node from which the data packet emanated is in the authorization list for the node.

If so, control passes to block 382 to first check whether the source node is attempting to lock the present node and pass a session key thereto—i.e., whether the source node is attempting to initiate a secured link with the local node. This may be detected, for example, by assigning a particular extended transaction code for a lock transaction to indicate transmission of a session key. The data block in the packet would then include the session key being transmitted to the local node.

If the source node is attempting to transmit a session key, control passes to block 384 to update the authorization list entry for the source node with the session key passed in the data packet, whereby secure communications with the source node are then enabled. Control then passes to block 385 to corrupt the header CRC for the data packet, and thereby inhibit the acceptance of the data packet by the link layer—since the transmission of the session key is handled solely by the PHY layer in this implementation. Next, block 386 sends an "OK" acknowledgment back to the source node, thereby indicating that the authorization attempt was received and accepted. Routine 376 is then complete.

Transmitting session keys and returning acknowledgments thereto via the PHY layers may be done, for example, by using Tcode E packets, which are conventionally used to form a supervisory channel between a link layer and its associated PHY layer to permit the link layer to command the PHY layer. In this case, however, each secure-PHY layer would need to be capable of receiving and processing Tcode E packets received from the communications interface, in addition to those received from its associated link layer. Such packets conventionally are ignored by conventional link layers and PHY layers, and as such, those layers would not be required to specifically handle reception of those codes. It should be appreciated that implementation of Tcode E packet handling circuitry to perform the functions described herein would be well within the ability of one of ordinary skill in the art. It should also be appreciated that other reserved Tcode packets, not to mention other manners of passing information between the PHY layers, may also be used in the alternative.

Returning to block 382, if the source node is not attempting to pass a session key, control passes to block 388 to determine whether the session key is valid. If not, control passes to block 389 to corrupt the header CRC for the packet to cause the link layer to disregard the data packet, as a current session key has not yet been exchanged since the last bus reset. Also, in block 390, a "NAK" (no acknowledgment) signal is returned to the source node to indicate that the requested data is unavailable. Routine 376 is then complete.

Typically, the no acknowledgment signal is transmitted as an acknowledge packet having an acknowledge code that indicates rejection of the received packet, e.g., by indicating an error in the received packet. The error may be such that the received packet is retransmitted by the source node (e.g., an acknowledgment that indicates that the local node is busy), although by using a code that does not result in retransmission (e.g., an acknowledgment data or conflict error code) is often beneficial since it is typically not desirable to receive any more transmissions from the unauthorized source node. In the alternative, it may be desirable to return a response packet in lieu of or in addition to an acknowledge packet, e.g., to further ensure that no further transmissions will be forwarded by the source node.

Returning to block 388, if the session key is valid, control passes to block 392 to obtain the cipher type (if multiple encryption engines are supported) and session key for the source node from the authorization list. Then, block 394 analyzes the cipher data in the data block for the data packet and decrypts the cipher data into clear data, in a manner well known in the art. The cipher data is then replaced in the data packet as the data is transmitted to the link layer, so that the data block forwarded to the link layer is decrypted. An "OK" acknowledgment is then passed back to the source node in block 396 to acknowledge receipt of the data packet, and routine 376 is complete.

Now returning to block 380, if the source node is not on the authorization list, no secure communications are permitted therewith. Thus, control passes to block 398 to determine whether the node is selective-secured or secure only. In this implementation, the determination of whether a node is secure only or selective-secured is typically implemented in the secure PHY device, e.g., as a hardwired pin on the device, among the other alternatives discussed above.

If the node is selective-secured, the data packet being transmitted can simply be forwarded without modification to the link layer. As such, control passes to block 400 to send an "OK" acknowledgment signal to the to the source node, and processing by routine 376 is complete. It should be appreciated that block 398 may also check whether a data packet is requesting data from a secured or unsecured portion of the memory address space for the node, and act appropriately to selectively abort requests directed to the secured portion of the node's memory access space.

It should be appreciated that, if the data packet is passed unmodified to the link layer, and the data packet is not encrypted, then the link layer will receive a conventional unsecured IEEE 1394 data packet, which is processed thereby in a manner known in the art. On the other hand, if the data packet is in fact encrypted, the link layer will receive in essence garbage data, which will be disregarded by the link layer in a manner known in the art.

Returning to block 398, if the node is secure only, control passes to block 399 to corrupt the header CRC for the data packet being forwarded to the link layer, thereby resulting in the link layer disregarding the data packet. Control then passes to block 402 to send a no acknowledgment to the source node to indicate that the requested data is unavailable, whereby routine 376 is then complete.

Thus, it may be seen that the use of a secure PHY integrated circuit device provides a significant advantage by permitting the implementation of security functionality in an IEEE 1394 or other memory mapped communications interface with minimal design and/or retrofitting of legacy components. Furthermore, it should be appreciated that secure PHY integrated circuit devices consistent with the invention may implement any or all of the above-described node types, as well as any of the modifications or enhancements described above.

Other modifications will be apparent to one of ordinary skill in the art. Therefore, the invention lies in the claims hereinafter appended.

What is claimed is:

1. A physical layer circuit arrangement for interfacing a local node in an electronic device to a memory-mapped serial communications interface of the type that supports peer-to-peer communications between a plurality of nodes, the circuit arrangement comprising:

(a) a link layer interface coupled to a link layer defined in the electronic device, the link layer interface configured to transmit data to and receive data from the link layer; and (b) a security manager coupled to the link layer interface and configured to modify a data packet received over the communications interface from an unauthorized node prior to transmission of the data packet over the link layer interface to inhibit acceptance of the modified data packet by the link layer.

2. The circuit arrangement of claim 1, wherein the circuit arrangement is disposed in a separate integrated circuit device from the link layer in the electronic device.

3. The circuit arrangement of claim 1, wherein the data packet includes a checksum, wherein the link layer is of the type that discards a data packets having an invalid checksum, and wherein the security manager is configured to modify the data packet by modifying the checksum therefor.

4. The circuit arrangement of claim 1, wherein the security manager is further configured to transmit an acknowledgment over the communications interface to the unauthorized node.

5. The circuit arrangement of claim 4, wherein the acknowledgment transmitted by the security manager indicates that data requested by the unauthorized node is unavailable.

6. The circuit arrangement of claim 1, wherein the security manager includes an encryption engine configured to selectively encrypt data received through the link layer interface, and to selectively decrypt data received from authorized nodes over the communications interface.

7. The circuit arrangement of claim 6, wherein the link layer defines a local node for the electronic device, and wherein the security manager further includes:

(a) an authorization list of authorized nodes from the plurality of nodes for which communication therewith is authorized; and (b) a key exchange engine configured to generate a session key for the local node.

8. The circuit arrangement of claim 1, wherein the security manager is further configured to, in response to transmission of a transmit data packet from the link layer to the unauthorized node, notify the link layer via the link layer interface that the unauthorized node is unavailable.

9. The circuit arrangement of claim 1, wherein the communications interface is an IEEE 1394-compatible interface.

10. The circuit arrangement of claim 9, wherein the link layer is of the type supporting unsecured IEEE 1394-compatible communications.

11. An electronic device including the circuit arrangement of claim 1.

12. A data processing system including a plurality of nodes, at least one node including the circuit arrangement of claim 1.

13. A method of controlling access to a local node in an electronic device from a memory-mapped serial communications interface of the type that supports peer-to-peer communications between a plurality of nodes, the method comprising:

(a) receiving a data packet over the communications interface from an unauthorized node; and (b) modifying the data packet prior to transmitting the data packet over a link layer interface to a link layer in the electronic device to inhibit acceptance of the modified data packet by the link layer.

14. The method of claim 13, further comprising generating an authorization list of authorized nodes from the plurality of nodes for which communication with the local node is authorized.

15. The method of claim 14, wherein generating the authorization list is performed in response to a reset of the communications interface.

16. The method of claim 14, further comprising:

(a) generating a session key for the local node, the session key for use by an encryption engine at an authorized node from the authorization list when encrypting data to be transmitted to the local node; and (b) transmitting the session key to each authorized node in the authorization list.

17. The method of claim 16, further comprising:

(a) receiving a receive data packet over the communications interface from an authorized node;

(b) decrypting the receive data packet to generate a decrypted data packet; and (c) transmitting the decrypted data packet over the link layer interface to the link layer.

18. The method of claim 14, further comprising:

(a) receiving a transmit data packet over the link layer interface from the link layer, the transmit data packet including a target identifying at least one authorized node from the authorized list;

(b) encrypting the transmit data packet to generate an encrypted data packet; and (c) transmitting the encrypted data packet over the communications interface to the authorized node identified by the target.

19. The method of claim 14, further comprising:

(a) receiving a transmit data packet over the link layer interface from the link layer, the transmit data packet including a target identifying an unauthorized node absent from the authorized list; and (b) notifying the link layer via the link layer interface that the unauthorized node is unavailable.

20. The method of claim 13, wherein the data packet includes a checksum, wherein the link layer is of the type that discards a data packets having an invalid checksum, and wherein modifying the data packet includes modifying the checksum therefor.

21. The method of claim 13, further comprising transmitting an acknowledgment over the communications interface to the unauthorized node in response to receipt of the data packet.

22. The method of claim 21, wherein the acknowledgment indicates that data requested by the unauthorized node is unavailable.

23. The method of claim 1, wherein the communications interface is an IEEE 1394-compatible interface.

24. The method of claim 23, wherein the link layer is of the type supporting unsecured IEEE 1394-compatible communications.

25. A method of implementing secure communications over a memory-mapped serial communications interface of the type that supports unsecured peer-to-peer communications between a plurality of nodes, wherein each node includes a link layer implemented in a first integrated circuit device, the link layer configured to communicate over the communications interface solely through an unsecured protocol, the method comprising:

(a) installing, in at least first and second nodes from the plurality of nodes, a second integrated circuit device, the second integrated circuit device implementing a physical layer circuit arrangement that interfaces the link layer in the first integrated circuit device with the communications interface, the physical layer circuit arrangement including a security manager coupled between the link layer and the communications interface and configured to modify a data packet received over the communications interface from an unauthorized node prior to transmission of the data packet to the link layer to inhibit acceptance of the modified data packet by the link layer.

* * * * *